US010877792B2

(12) United States Patent
Niestemski et al.

(10) Patent No.: US 10,877,792 B2
(45) Date of Patent: Dec. 29, 2020

(54) SYSTEMS AND METHODS OF APPLICATION-AWARE IMPROVEMENT OF STORAGE NETWORK TRAFFIC

(71) Applicant: Virtual Instruments Corporation, San Jose, CA (US)

(72) Inventors: Francis Niestemski, Longmeadow, MA (US); Ryan E. Perkowski, Middletown, DE (US); Nicholas York, San Ramon, CA (US)

(73) Assignee: Virtual Instruments Corporation, San Jose, CA (US)

( * ) Notice: Subject to any disclaimer, the term of this patent is extended or adjusted under 35 U.S.C. 154(b) by 63 days.

(21) Appl. No.: 16/234,384

(22) Filed: Dec. 27, 2018

(65) Prior Publication Data

US 2019/0207818 A1    Jul. 4, 2019

Related U.S. Application Data

(60) Provisional application No. 62/611,892, filed on Dec. 29, 2017.

(51) Int. Cl.
*G06F 9/455* (2018.01)
*H04L 12/24* (2006.01)
(Continued)

(52) U.S. Cl.
CPC ........ *G06F 9/45558* (2013.01); *G06F 9/5077* (2013.01); *H04L 41/0233* (2013.01);
(Continued)

(58) Field of Classification Search
CPC .............. G06F 9/45558; G06F 9/5077; H04L 41/0233; H04L 41/06; H04L 41/065;
(Continued)

(56) References Cited

U.S. PATENT DOCUMENTS 7,185,192 B1    2/2007  Kahn
7,634,595 B1   12/2009  Brown
(Continued)

FOREIGN PATENT DOCUMENTS

EP    2262173    12/2010

OTHER PUBLICATIONS

International Application No. PCT/US2018/067760, International Search Report and Written Opinion dated Mar. 8, 2019.
(Continued)

*Primary Examiner* — Philip J Chea
*Assistant Examiner* — Robert B McAdams
(74) *Attorney, Agent, or Firm* — Ahmann Kloke LLP

(57) ABSTRACT

An example method comprises receiving a begin time to initiate storage network traffic data collection from a plurality of data probes integrated within an enterprise network, collecting network data identifying HBA ports used to communicate with storage ports from the probes, analyzing the network data to determine attributes of network traffic, determining for each storage unit: a penalty score for each of the storage ports determining a reconfiguration of a storage unit or HBA based at least in part on the total penalty score, simulating changes of the reconfiguration of the storage unit or the HBA and simulate storage network traffic, applying the simulated storage network traffic on the simulated changes of the reconfiguration of the storage unit or HBA to determine improvements, and outputting instructions to enable reconfiguration of the storage unit or HBA.

19 Claims, 7 Drawing Sheets

(51) Int. Cl.
*G06F 9/50* (2006.01)
*H04L 12/26* (2006.01)
*H04L 12/851* (2013.01)
*H04L 29/08* (2006.01)

(52) U.S. Cl.
CPC ............ *H04L 41/06* (2013.01); *H04L 41/065* (2013.01); *H04L 41/0681* (2013.01); *H04L 41/0896* (2013.01); *H04L 41/145* (2013.01); *H04L 43/026* (2013.01); *H04L 43/0876* (2013.01); *H04L 43/12* (2013.01); *H04L 43/16* (2013.01); *H04L 47/2441* (2013.01); *H04L 47/2483* (2013.01); *H04L 67/1097* (2013.01); *G06F 2009/4557* (2013.01); *G06F 2009/45591* (2013.01); *G06F 2009/45595* (2013.01); *H04L 67/10* (2013.01)

(58) Field of Classification Search
CPC ............ H04L 41/0681; H04L 41/0896; H04L 41/145; H04L 43/026
See application file for complete search history.

(56) References Cited

U.S. PATENT DOCUMENTS

| | | | |
|---|---|---|---|
| 8,065,133 B1* | 11/2011 | Asbridge | G06F 11/261 |
| | | | 703/23 |
| 8,495,611 B2 | 7/2013 | McCarthy | |
| 9,026,687 B1 | 5/2015 | Govande | |
| 9,928,183 B2 | 3/2018 | Svendsen | |
| 10,044,566 B1 | 8/2018 | Grisco | |
| 10,216,812 B2 | 2/2019 | Witkop | |
| 10,505,959 B1 | 12/2019 | Wang | |
| 10,735,430 B1 | 8/2020 | Stoler | |
| 2002/0083169 A1 | 6/2002 | Aki | |
| 2002/0156883 A1 | 10/2002 | Natarajan | |
| 2003/0167327 A1 | 9/2003 | Baldwin | |
| 2005/0081208 A1 | 4/2005 | Gargya | |
| 2005/0229182 A1* | 10/2005 | Grover | G06F 16/10 |
| | | | 718/105 |
| 2006/0184626 A1 | 8/2006 | Agapi | |
| 2006/0242647 A1 | 10/2006 | Kimbrel | |
| 2006/0271677 A1* | 11/2006 | Mercier | G06F 16/1824 |
| | | | 709/224 |
| 2007/0136541 A1 | 6/2007 | Herz | |
| 2008/0019499 A1 | 1/2008 | Benfield | |
| 2008/0104248 A1 | 5/2008 | Yahiro | |
| 2009/0016236 A1 | 1/2009 | Alcala | |
| 2009/0106256 A1* | 4/2009 | Safari | G06F 11/1433 |
| 2009/0241113 A1 | 9/2009 | Seguin | |
| 2009/0259749 A1* | 10/2009 | Barrett | G06F 11/3495 |
| | | | 709/224 |
| 2009/0319580 A1 | 12/2009 | Lorenz | |
| 2011/0107148 A1 | 5/2011 | Franklin | |
| 2011/0225017 A1 | 9/2011 | Radhakrishnan | |
| 2012/0030352 A1 | 2/2012 | Sauma Vargas | |
| 2012/0044811 A1 | 2/2012 | White | |
| 2012/0076001 A1 | 3/2012 | Saitou | |
| 2012/0089726 A1 | 4/2012 | Doddavula | |
| 2012/0131593 A1 | 5/2012 | DePetro | |
| 2012/0192197 A1 | 7/2012 | Doyle | |
| 2013/0060932 A1 | 3/2013 | Ofek | |
| 2013/0117847 A1 | 5/2013 | Friedman | |
| 2013/0152200 A1 | 6/2013 | Alme | |
| 2014/0112187 A1 | 4/2014 | Kang | |
| 2014/0173034 A1 | 6/2014 | Liu | |
| 2014/0331277 A1 | 11/2014 | Frascadore | |
| 2015/0074251 A1* | 3/2015 | Tameshige | G06F 11/202 |
| | | | 709/221 |
| 2016/0004475 A1 | 1/2016 | Beniyama | |
| 2016/0044035 A1 | 2/2016 | Huang | |
| 2016/0100066 A1 | 4/2016 | Yamada | |
| 2016/0119234 A1 | 4/2016 | Valencia Lopez | |
| 2016/0359897 A1 | 12/2016 | Yadav | |
| 2017/0085456 A1 | 3/2017 | Whitner | |
| 2017/0123849 A1 | 5/2017 | Tian | |
| 2017/0168866 A1 | 6/2017 | Kono | |
| 2017/0317899 A1 | 11/2017 | Taylor | |
| 2018/0067776 A1 | 3/2018 | Chen | |
| 2018/0081501 A1 | 3/2018 | Johnston | |
| 2018/0115585 A1 | 4/2018 | Rubakha | |
| 2018/0165451 A1 | 6/2018 | Kawakita | |
| 2018/0262432 A1 | 9/2018 | Ozen | |
| 2018/0324045 A1 | 11/2018 | Grisco | |
| 2019/0065230 A1 | 2/2019 | Tsirkin | |
| 2019/0073239 A1 | 3/2019 | Konnath | |
| 2019/0089617 A1 | 3/2019 | Raney | |
| 2019/0163589 A1* | 5/2019 | McBride | G06F 11/3442 |
| 2019/0243671 A1 | 8/2019 | Yadav | |

OTHER PUBLICATIONS

International Application No. PCT/US2019/058976, Search Report and Written Opinion dated Mar. 25, 2020.
International Application No. PCT/US2019/059282, Search Report and Written Opinion dated Apr. 7, 2020.
Androulidakis, G. et al., "Improving Network Anomaly Detection via Selective Flow-Based Sampling," IET Communications, vol. 2, No. 3, pp. 399-409, Mar. 2008.
Cejka, Tomas et al., "NEMEA: A Framework for Network Traffic Analysis," Proceedings of the 12th Conference on Network and Service Management (CNSM 2016), pp. 195-201, Nov. 2016.
Chandramouli, Ramaswamy, "Security Assurance Requirements for Hypervisor Deployment Features," Seventh International Conference on Digital Society, Feb. 2013.
Kind, Andreas et al., "Histogram-Based Traffic Anomaly Detection," IEEE Transactions on Network Service Management, vol. 6, No. 2, pp. 110-121, Jun. 2009.
Ramamoorthy, S. et al. "A Preventive Method for Host Level Security in Cloud Infrastructure," Proceedings of the 3rd International Symposium on Big Data and Cloud Computing Challenges, Feb. 2016.
Sethi, Chhabi et al., "Trusted-Cloud: A Cloud Security Model for Infrastructure as a Service (IaaS)," International Journal of Advanced Research in Computer Science and Software Engineering, vol. 6, No. 3, Mar. 2016.
Urias, Vincent E. et al., "Hypervisor Assisted Forensics and Incident Response in the Cloud," 2016 IEEE International Conference on Computer and Information Technology, Dec. 2016.
Wang, Wei et al., "Network Traffic Monitoring, Analysis and Anomaly Detection," Guest Editorial, IEEE Network, pp. 6-7, May 2011.

* cited by examiner

SYSTEMS AND METHODS OF APPLICATION-AWARE IMPROVEMENT OF STORAGE NETWORK TRAFFIC

CROSS-REFERENCE TO RELATED APPLICATIONS

The present application claims benefit of U.S. Provisional Patent Application Ser. No. 62/611,892, filed Dec. 29, 2017 and entitled "Systems and Methods for Performance Management of Data Infrastructure," which is incorporated by reference herein. In addition, the following applications filed on Dec. 27, 2018 are incorporated by reference herein: U.S. Nonprovisional patent application Ser. No. 16/234,353 entitled "System and Method of Application Discovery," U.S. Nonprovisional patent application Ser. No. 16/234,402 entitled "System and Method of Flow Source Discovery," U.S. Nonprovisional patent application Ser. No. 16/234,424 entitled "System and Method of Dynamically Assigning Device Tiers Based on Application," U.S. Nonprovisional patent application Ser. No. 16/234,440 entitled "Systems and Methods of Discovering and Traversing Coexisting Topologies," and U.S. Nonprovisional patent application Ser. No. 16/234,452 entitled "System and Method of Cross-Silo Discovery and Mapping of Storage, Hypervisors and Other Network Objects."

FIELD OF THE INVENTION

Embodiments of the present invention(s) related generally to configuring storage network traffic of a network, such as an enterprise network, based at least on the application associated with the storage and network traffic.

BACKGROUND

Complexity of enterprise networks has increased to a point where even information technology (IT) administrators may not have a clear picture of the network utilization of the enterprise network. Enterprise networks are increasingly moving towards a combination of on-premise and cloud-based infrastructure, making the ability to determine computing and storage resources associated with business-related application more difficult.

Corporations demand acceptable levels of performance, reliability, redundancy, and security from its computing and storage devices. One way to achieve performance, reliability, and redundancy is to provide more resources than the computing environment would ever need. Unfortunately, the cost of IP equipment, software and personnel can be prohibitively expensive, and would run contrary to an overall goal of an enterprise of profitability. Every corporation must strike a balance between their the cost of additional computing and storage versus performance, reliability and redundancy benefits of the additional computing and storage resources.

In order to optimize on the whole storage area network of the enterprise network, an external device may require total access to all the relevant information of each device. This information is rarely made available as device manufacturers and software tools look to provide data relevant only to their respective device or software tool in their respective format. This makes it difficult to identify potential bottlenecks in the communication between entities of the enterprise network associated with important business-related applications.

SUMMARY

An example system comprises one or more processors and memory containing instructions configured to control the one or more processors to: receive a begin time to initiate storage network traffic data collection from a plurality of data probes integrated within an enterprise network, the enterprise network in communication with the storage network, collect network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, analyze the network data to determine attributes of network traffic, the attributes of the network traffic including read and write speeds of each storage port, the read speed and write speed being based at least in part on the information communicated between each of the plurality of specific HBA ports and the specific storage ports, for each storage unit determine: a penalty score for each of the storage ports associated with a particular storage unit, the penalty score being based at least in part on the read speed and write speed for that storage port; and a total penalty score aggregating penalty scores associated with storage ports of the particular storage unit determine a reconfiguration of a storage unit or HBA based at least in part on the total penalty score of the storage unit, simulate changes of the reconfiguration of the storage unit or the HBA and simulate storage network traffic based on at least some of the previously collected network data, apply the simulated storage network traffic on the simulated changes of the reconfiguration of the storage unit or HBA to determine improvements of performance of the storage unit or HBA, and output instructions to enable reconfiguration of the storage unit or HBA based on the simulation of the storage network traffic on the simulated changes of the reconfiguration of the storage unit or HBA.

The method may further comprise receiving an end time to initiate storage network traffic data collection from the plurality of data probes integrated within the enterprise network. The enterprise network may include the storage network. Data probes may be hardware probes configured to monitor storage ports of the storage unit. In some embodiments, data probes are software probes configured to receive storage network traffic from a switch fabric of the enterprise network.

Analyzing the network may further determine workload divergence of each storage port, the workload divergence based at least in part on the information communication between each of the plurality of specific HBA ports and the specific storage ports. Attributes of the network traffic may further include workload divergence, utilization per tier, buffer credit, and failover simulation.

The penalty score for each of the storage port associated with the particular storage port may include a plurality of individual penalty scores. Each of the plurality of individual penalty scores may be weighted.

The simulate changes of the reconfiguration of the storage unit or HBA may include simulation failure one or more of a plurality of entities of the enterprise network. Simulate changes of the reconfiguration of the storage unit or HBA may include simulation of HBA-storage port configuration of the enterprise network. The simulation of HBA-storage port configuration may include changing the HBA-storage port configuration of a data path of the enterprise network. The simulation of HBA-storage port configuration may be randomized.

A method may comprise receiving a begin time to initiate storage network traffic data collection from a plurality of data probes integrated within an enterprise network, the enterprise network in communication with the storage network, collecting network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, analyzing the network data to determine attributes of network traffic, the attributes of the network traffic including read and write speeds of each storage port, the read speed and write speed being based at least in part on the information communicated between each of the plurality of specific HBA ports and the specific storage ports, determining for each storage unit: a penalty score for each of the storage ports associated with a particular storage unit, the penalty score being based at least in part on the read speed and write speed for that storage port, and a total penalty score aggregating penalty scores associated with storage ports of the particular storage unit, determining a reconfiguration of a storage unit or HBA based at least in part on the total penalty score of the storage unit, simulating changes of the reconfiguration of the storage unit or the HBA and simulate storage network traffic based on at least some of the previously collected network data, applying the simulated storage network traffic on the simulated changes of the reconfiguration of the storage unit or HBA to determine improvements of performance of the storage unit or HBA, and outputting instructions to enable reconfiguration of the storage unit or HBA based on the simulation of the storage network traffic on the simulated changes of the reconfiguration of the storage unit or HBA.

A computer program product may comprise a computer readable storage medium having program code embodied therewith. The program code executable by a computing system to cause the computing system to perform: receiving a begin time to initiate storage network traffic data collection from a plurality of data probes integrated within an enterprise network, the enterprise network in communication with the storage network, collecting network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, analyzing the network data to determine attributes of network traffic, the attributes of the network traffic including read and write speeds of each storage port, the read speed and write speed being based at least in part on the information communicated between each of the plurality of specific HBA ports and the specific storage ports, determining for each storage unit: a penalty score for each of the storage ports associated with a particular storage unit, the penalty score being based at least in part on the read speed and write speed for that storage port, and a total penalty score aggregating penalty scores associated with storage ports of the particular storage unit, determining a reconfiguration of a storage unit or HBA based at least in part on the total penalty score of the storage unit, simulating changes of the reconfiguration of the storage unit or the HBA and simulate storage network traffic based on at least some of the previously collected network data, applying the simulated storage network traffic on the simulated changes of the reconfiguration of the storage unit or HBA to determine improvements of performance of the storage unit or HBA, and outputting instructions to enable reconfiguration of the storage unit or HBA based on the simulation of the storage network traffic on the simulated changes of the reconfiguration of the storage unit or HBA.

DETAILED DESCRIPTION

Figure 1:
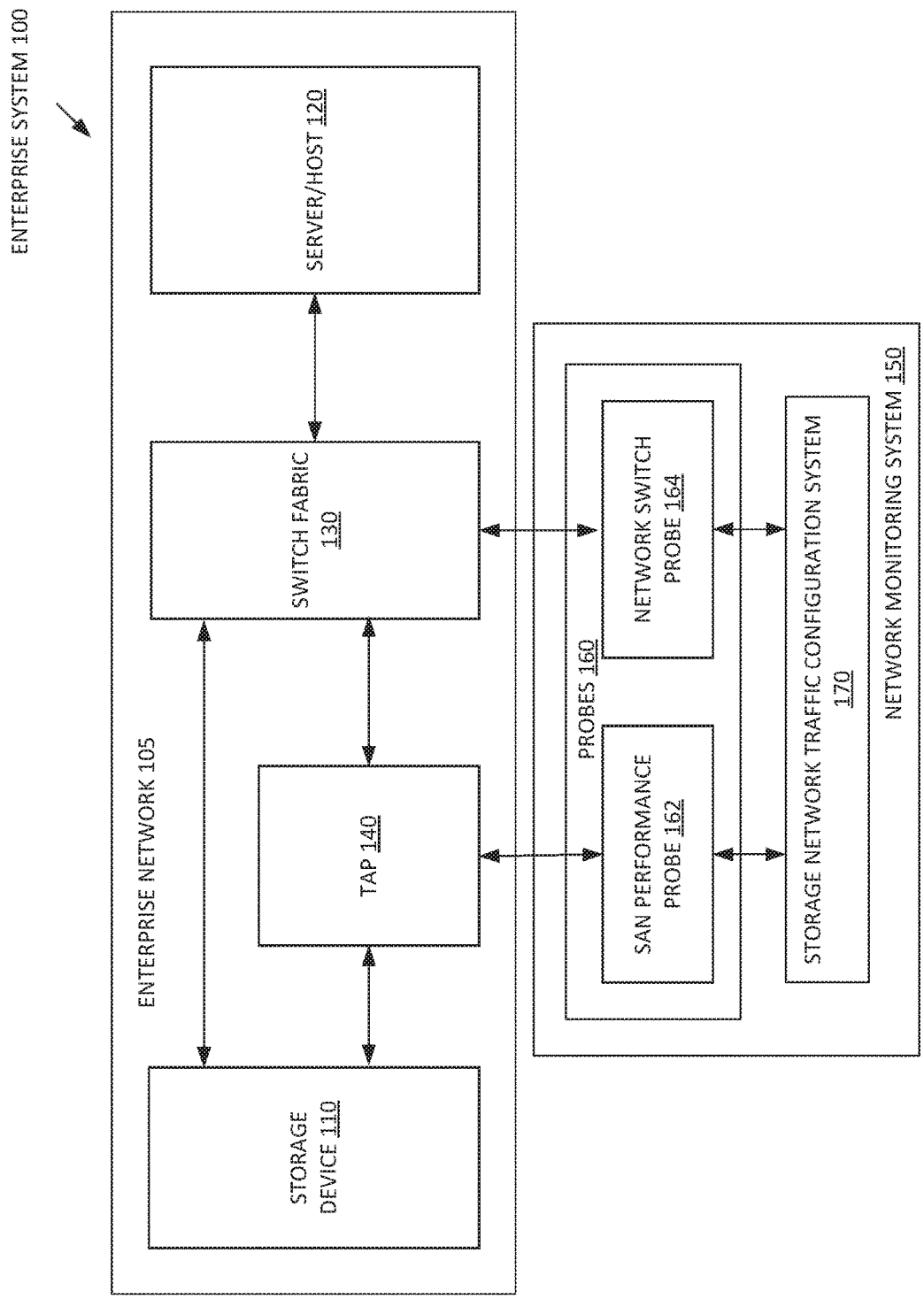
FIG. 1 depicts a block diagram of an enterprise system capable of configuring storage network traffic based at least on the application associated with the network traffic according to some embodiments.

Various embodiments provide customers to deliver on complex requirements of their application infrastructure. Systems discussed herein may provide insights into the performance and availability of the end-to-end system—across physical, virtual and cloud environments. The system may intelligently capture, correlate, and/or analyze both breadth and depth of data, transforming data regarding an assets/applications of an enterprise network into answers and actionable insights. This allows the promotion of performance-based Service Level Agreements, changing the value of the infrastructure. With these insights, user may be able to take control of their environment, accurately inform collaborative dialogues, and drive business outcomes.

Enterprise networks typically consist of computing and storage resources designed to run business-related applications of an organization. Applications of the enterprise network, may include, for example, email service, web service, database, customer relationship management (CRM), data file, virtual desktop infrastructure (VDI), enterprise resource planning (ERP), and the like. It is preferable that most important applications of the enterprise network be given the most amount of resources and the least important applications would be given the least amount of resources. For example, Applications may have tiers (e.g., SLA tiers), where tier 0 is more important than tier 1 and tier 1 is more important than tier 2 and so on. While tiers are discussed where lower is more critical, it will be appreciated that systems and methods discussed herein may apply to any ordering of tiers in any way.

Certain host business adapters may be limited to certain applications. For example, a healthcare database, such as the EPIC database at a hospital may be a tier 0 application which may be assigned a host bus adapter (HBA) which is not shared with any other applications. A less important application, such as an email application at the hospital may share HBA devices and storage ports with other applications.

Traditionally, some networks may use a least utilization method to connect a storage array to the network. A storage port may be connected to a particular HBA through one part of the switch fabric that has the least utilization at a particular time. However, the storage port may be associated with any number of applications that, at the particular time, were not being used yet, but may be used later, which may cause the storage port, the particular HBA, and/or the one part of the switch fabric to become overloaded.

One way for IT administrators to monitor aspects of the increasingly complex enterprise network is with assistance from a wide variety of standalone and integrated software tools available to aid in the monitoring various aspects of the enterprise network. For example, the fiber channel (FC) switch fabric may be monitored using network switch probes. A switch probe may provide a copy of data passing through a switch (e.g., router or bridge) of the enterprise network without affecting the integrity of the data. The copy may be used for real time performance monitoring of the traffic travelling through the switch.

In some embodiments, monitoring software may be integrated in a storage device such as a storage area network (SAN). However, each of these subsystems may only look to improve the local environment that the software tools have visibility into and, in many cases, optimizing a single link in one data path of the network can take other data path of the network out of balance.

In order to configure the connection between storage devices such as SAN and entities of the network such as servers, a monitoring entity may require total access to relevant information for each of the SAN and servers in the network. This information may not be readily available as device manufacturers and software tools look to provide data relevant only to their respective device or software tool in their respective format, making it difficult to identify potential bottlenecks in the communication between entities of the network associated with important business-related applications. The cause and effect of potential bottlenecks in the communication between entities of the network may be difficult to identify if an IT administrator needs to analyze data from each entity of the enterprise network separately.

For example, server utilization of a particular server may be reviewed using a server monitoring software to find that for a high utilization time frame during a couple of hours each afternoon, the server would be at 98% utilization. Using this information, network traffic data from the switch fabric monitoring system may be reviewed and traffic on the switch fabric during that time period analyzed to determine data paths which may be the cause of the increased server utilization during the high utilization time frame. Identifying the one or more data paths which experience a high level of traffic during the high utilization time frame may enable determination if the high utilization of the particular server is caused by potential bottlenecks in the switch fabric. At the same time, storage performance and monitoring tools of one or more SAN or other entities of the network may be reviewed to understand the cause of the high utilization of the particular server. In some cases, the high utilization of that particular server may be caused by a host or a server that is coupled to one or more entities along the data path of the particular server. This may be a process that takes hours or days, which may mean a loss of productivity and/or revenue.

Entities are logical and intuitive groupings of systemwide devices and workloads that may be based on function, correlation, and/or interdependency. Entities enable users to logically group system-wide resources, from physical devices to application workloads, in order to provide the authoritative insights required to understand how resources and applications are performing. IT teams may configure entities to show all of the resources supporting a specific application, business unit, or tier of service.

Enterprise systems may comprise hundreds of applications spread out over thousands of switches, hosts, storage devices and other devices. An ideal storage network traffic configuration, such as an HBA-storage port configuration, may require a storage network traffic configuration process based on attributes associated with the applications.

For example, a user of the enterprise network complains of slow response of the EPIC database application of the enterprise network. A diagnostic may be run on one or more storage resources on which the EPIC database application is known to be running on using storage performance monitoring tools. The storage performance monitoring tool may determine that no storage performance problem exist. Network switch probes monitoring the FC switch fabric of the enterprise network may not be able to pin point reason for the slow response of the EPIC database application, since this software would only have access to data regarding traffic on the switch fabric, and not the performance of other entities of the EPIC database application connected to the switch fabric. A common solution to the issue may be to increase the storage array capacity of the enterprise network, which may not result in an improvement in response time of the storage array.

A storage network traffic configuration system may be used to give recommendations (e.g., to IT administrators) of possible HBA-storage port configurations for the network to achieve improved network traffic and distribute data requests across storage ports of the network. These recommendations may be obtained based on attributes of the applications, such as tier mapping of the application and past network traffic data. The storage network traffic configuration process may obtain real-time views of the storage network traffic that is most relevant and important. In addition, the storage network traffic configuration system may determine data paths on which data regarding important applications are transported and monitor application behavior and their effect on infrastructure resources. For example, the storage network traffic configuration process can determine the health, utilization and performance data for storage controllers, ports and hosts. In some embodiments, the storage network traffic configuration process provides real-time visibility into the performance, health and utilization of network traffic across physical, virtual, and cloud computing environments.

The storage network traffic configuration system may receive a request to initiate network traffic data retrieval from probes of the enterprise network. The storage network traffic configuration system may receive from a user of the network, a time frame to retrieve data from the probes of the network. Using the information retrieved from the probes, the storage network traffic configuration system may analyze the retrieved data using a past data analysis process. In some embodiments, the storage network traffic configuration system may determine the HBA-storage port configuration of the network during the time frame.

Past data analysis process may include weighing any number of penalty rules according to any number of network factors. Some examples of network factors include a prioritization of memory read over memory write, keeping the utilization of network entities on which mission-critical applications are running on at less than an utilization threshold, dedicating certain network resources, such as one or more SAN, servers and switches for applications of a certain tier mapping, and the like. The output of the past data analysis process may be a recommendation which is based on a total penalty score. In various embodiments, storage network traffic configuration system may receive from the IT administrator of the network input values of any number of network factors. Using the network input values, the penalty rules may be weighted accordingly. In one example, the storage network traffic configuration system may have defaulted values for any number of network factors.

Any number of penalty rules may include typical utilization usage for read and write, workload divergence for read and write, priority tier sharing ports, path speed, and/or buffer credit and others. In some embodiments, the storage network traffic configuration system may apply the weighting of any number of penalty rules to the retrieved data to determine a total penalty score.

In various embodiments, the output of the past data analysis process is a recommendation. In some embodiments, the recommendation may include the total penalty score, the score for each of the penalty rules, the weighting of each rule and the HBA-storage port configuration from all the points in time within the time frame to an user interface using a reporting module.

Certain time periods within the time frame may be weighted more than others. For example, if the time frame in which the analyzed data is used for the past data analysis is 7 days, a time period weighting factor may be applied to a particular time period such as 9 a.m. to 5 p.m. during each weekday. This particular time period may represent a window in which it is more important that the performance of the network is improved or optimized. In various embodiments, the weighting rules may be used in conjunction with the time period weighting factors to determine a total penalty score for the time frame.

The output of the past data analysis may be used to determine one or more recommendations of HBA-storage port configurations. There may be many ways to determine the one or more recommendations of HBA-storage port configuration for a future time including, but not limited to: calculation of a standard deviation for each metric, simulation of various HBA-storage port configurations, and/or simulation of hardware failures.

The storage network traffic configuration system may receive input from a network professional (e.g., the IT administrator of the network) or another device on the network. For example, the input from the IT administrator may include a selection of a recommendation penalty. The recommendation penalty may include, for example, one or more of the following: the total penalty score from the past data analysis, a standard deviation simulation penalty score, a configuration simulation scenario penalty score, and/or a hardware failure simulation penalty scores.

An HBA-storage port configuration may be associated with the selected recommendation penalty and the storage network traffic configuration system may send a change ticket to an IT management software platform such as ServiceNow to make any changes to the HBA, storage port, or switch fabric of the network.

The storage network traffic configuration system may receive input (e.g., from the IT administrator) to initiate network traffic data retrieval from the network where changes to the HBA, storage port or switch fabric were made. Using information retrieved from the probes, the storage network traffic configuration system may determine if any changes made to the HBA, storage port, or switch fabric of the network resulted in an improvement of the total penalty score of the network.

FIG. 1 depicts a block diagram of an enterprise system 100 capable of configuring storage network traffic based at least on the application associated with the network traffic according to some embodiments. In this example, the enterprise system 100 comprises enterprise network 105 and network monitoring system 150. The enterprise network 105 includes storage device 110, server/host 120, switch fabric 130, and traffic access points (TAP) 140. The network monitoring system 150 includes probes 160 and storage network traffic configuration system 170, the probes 160 comprising SAN performance probe 162 and network switch probe 164.

Storage devices 110 of the enterprise system 100 is a storage system that stores data. In one embodiment, the storage devices 110 is a disk array. In some examples, the storage device is a storage array network. In various embodiments, the storage device is cloud storage.

Server/host 120 includes any digital device on the enterprise network that may offer information resources, services, and applications to users or other nodes on the network. The server/host 120 may be an instance of an operating system, in some examples, a physical computer managed by Microsoft Windows. In some embodiments, hosts or servers may include one or more virtual machines. In various embodiments, hosts 120 may include instances of UNIX, Red Hat, Linux and others.

The switch fabric 130 may include any number of switches (e.g., routers or bridges) that enable communication within the enterprise network as well as communication with devices in the enterprise network. The switch fabric 130 may provide communication between any two entities of the enterprise system 100 such as the storage devices 110, the server/host 120, the TAP 140 and the network monitoring system 150. A switch fabric may be a basic topology of the layout of how the network is connected to switch traffic. The switch fabric 130 may use packet switching to receive, process and forward data from a source device to a destination device.

The TAP 140 may divert at least a portion of the signals being transmitted along each data path of the enterprise network 105 to the network monitoring system 150. A TAP may be a traffic access point. The TAP 140 is an optical splitter which provides a copy of data passing through a fiber optic channel of the enterprise network 105 without affecting the integrity of the data. The fiber optic channel connecting storage devices with servers of the enterprise network. The copy may be used for real time performance monitoring of the traffic travelling through the fiber optic channel.

The network monitoring system 150 may analyze signals received from the TAP patch panel and/or from the switch fabric 130 to configure storage network traffic based at least on the application associated with the network traffic. In some embodiments, the TAP 140 may provide connectivity to links between storage ports of the storage device 110 and switches of switch fabric 130. In various embodiments, the TAP 140 may provide connectivity on both sides of fabric based storage virtualizers.

The network monitoring system 150 may monitor various aspects of the enterprise system 100 to determine an HBA-storage port configuration that improves network traffic and distribute data requests across storage ports of the network. The HBA-storage port configuration may be determined using past data analysis.

Past data analysis may include a process of receiving a request to initiate network traffic data retrieved from the enterprise network 105. The request to initiate network traffic data may include a time frame to retrieve data and receiving from any number of probes (or one or more databases storing data received at least in part from one or more probes) network traffic data from the time frame. In some embodiments, the past data analysis may include receiving from an application discovery system, data regarding attributes of one or more applications of the network and attributes of entities associated with the one or more applications of the network. Any number of penalty rules may be weighed using the network traffic data received during the time frame. A result of the past data analysis may be a baseline recommendation, the recommendation may include a total penalty score for that time frame. The total penalty score may be used as a baseline as a comparison for recommendations of HBA-storage port configuration. The HBA-storage port configuration from which the total penalty score is derived from may be considered a baseline HBA-storage port configuration.

In some embodiments, the probes 160 may include a SAN performance probe 162 and a network switch probe 164. Using data from the probes 160, the storage network traffic configuration system 170 may distribute the HBA-storage port configuration of one or more data paths of the enterprise system 100 based at least on one or more application associated with the entities of the enterprise system 100.

The SAN performance probe may be a hardware probe integrated into the probes 160. The SAN performance probe 162 may be deployed on connections between storage ports and switches, or on both sides of fabric-based storage virtualizers. In various embodiments, the SAN performance probe 162 may analyze fiber channel frames on monitored SAN ports. The SAN performance probe 162 may be coupled to the storage device 110 and/or switch fabric 130 via the TAP 140. In some embodiments, the SAN performance probe may monitor fiber channel SANs.

In some embodiments, a network switch probe 164 may be an agentless software that utilizes one or more application programming interfaces (APIs) to gather switch performance and link error statistics from the switch fabric 130. The network switch probe 164 may utilize Storage Management Initiative Specification (SMI-S) which is a standard intended to facilitate the management of storage devices from some SAN vendors. The network switch probe 164 may discover and present to the storage network traffic configuration system 170 entities of the enterprise network 105 to aid in building an infrastructure topology. The entities of the enterprise network 105 may include physical fabric, logical fabric, physical switches, logical switches, blades and switch ports.

In some embodiments, the storage network traffic configuration system 170 is capable of configuring storage network traffic based on one or more applications associated with the network traffic.

At the beginning of the time frame, the storage network traffic configuration system 170 may retrieve data from the probes 160. The retrieved data may be analyzed to determine attributes of the network traffic. The attributes of the network traffic may include a read speed, write speed, response time, number of items sitting in the queue, storage port utilization, workload being generated by each HBA connected to a storage port, number of requests generated per second, how large each request is, such as 4 k, 8 k, 32 k, and/or the like.

The effectiveness of any given HBA-storage port configuration may be determined by performing past data analysis. The storage network traffic configuration system 170 may analyze attributes of the network traffic during the time frame using the past data analysis. The past data analysis may be include determining a penalty score of the HBA-storage port configuration of the enterprise system 100 and weighting any number of penalty rules. The penalty rules may be weighted based on network factors such as prioritizing memory reads over memory writes, keeping the utilization of network entities on which mission-critical applications are running on at less than an utilization threshold, dedicating certain network resources, such as one or more SAN, servers and switches for applications of a certain tier mapping, and/or the like.

The past data analysis may include applying the analyzed data to any number of weighted penalty rules. The weighting of the penalty rules may be based on input from the IT administrator of the enterprise system 100. The result of the past data analysis may be a total penalty score for that time frame. The total penalty score may be used as a baseline as a comparison for recommendations of HBA-storage port configuration for a future time. The storage network traffic configuration system 170 may present the HBA-storage port configuration associated with the total penalty score as a recommendation to the IT administrator.

In various embodiments, time frames are not given time period weighting, and the total penalty score may represent a "best for all time periods within the time frame." In some embodiments, certain time periods within the time frame are weighted more than others. For example, in an enterprise system for a trading store, the time frame in which the retrieved data is used for past data analysis may be 7 days, the core trading hours of 9:30 a.m. to 4:00 p.m. during each weekday may be given the highest weighting, while pre-opening session or after hours trading during each day may give a lower weighting, while the rest of the time frame may be given a lowest weighting.

Using the baseline total penalty score, the storage network traffic configuration system 170 may determine one or more HBA-storage port configurations and present the one or more HBA-storage port configurations as any number of recommendations for a future time. There may be many ways of coming up with the one or more recommendations of HBA-storage port configuration including: calculation of a standard deviation for each metric, simulation of various HBA-storage port configurations, and/or simulation of hardware failures.

One way to determine a recommendation of an HBA-storage port configuration for a future time is by calculation of a standard deviation for any number of metrics. The metrics may include utilization usage for read and write, priority tier sharing ports, data path speed, and/or the like. The storage network traffic configuration system may determine and record the standard deviation of each metric. Additional traffic based on the $1^{st}$, $2^{nd}$ and $3^{rd}$ standard deviations of each metric can be added to different data paths of the network. For example, a storage network traffic configuration system may identify one or more data paths of the network associated with a tier 0, business critical application and add a $1^{st}$, $2^{nd}$ or $3^{rd}$ deviation of a metric such as maximum read speed, and/or typical write speed as a standard deviation simulation scenario.

Using the standard deviation simulation scenario, the storage network traffic configuration system may determine the response of the simulation scenario to unexpected loads or traffic on the network in the form of a standard deviation simulation penalty score. Any number of standard deviation simulation scenarios may be used to determine any number of standard deviation simulation penalty scores. In some embodiments, any number of standard deviation simulation scenario penalty scores may be a part of any number of standard deviation simulation recommendations. Any number of standard deviation recommendations may be outputted by the storage network traffic configuration system 170.

Another way to determine a recommendation of and/or control of a HBA-storage port configuration may be to perform simulations of various HBA-storage port configurations. The storage network traffic configuration system may create any number of configuration simulation scenarios. Each of the configuration simulation scenarios may change the HBA-storage port configuration of one or more data paths. A number of factors may be taken into account to determine different configuration simulation scenarios, such as configuring HBA and/or storage ports so that utilization of storage ports stay below a storage port utilization threshold.

In various embodiments, other factors may be taken into account to determine different HBA-storage port configuration including, for example, taking into account restricted storage ports, unused storage ports, and/or boundary conditions. The IT administrator of the network may restrict storage ports for purposes of redundancy and disaster recovery. The restrictions may be enforced and not allow an HBA to connect a data path to a completely unused storage port. Boundary conditions that may be employed may include the total number of rearrangements suggested by configuration simulation scenarios.

In some embodiments, the storage network traffic configuration system may take into account one or more factors and randomize HBA-storage port configurations to create one or more configuration simulation scenarios. Network data retrieved from the probes 160 may be used along with the configuration simulation scenario to determine a configuration simulation scenario penalty score. Any number of configuration simulation scenarios may be used to determine any number of configuration simulation scenario penalty scores. In some embodiments, the configuration simulation scenario penalty scores may be a part of any number of configuration simulation recommendations. The configuration recommendations may be outputted by the storage network traffic configuration system 170.

Recommendations of the HBA-storage port configuration for the future time may be utilized to perform simulations of hardware failures. Different hardware entities, such as storage ports and HBA's, can be simulated to fail in a hardware failure simulation scenario. The storage network traffic configuration system may calculate redistribution of the data traffic using the simulation scenario. The network data retrieved from the probes 160 may be used along with the hardware failure simulation scenario to determine a hardware failure simulation penalty score. A hardware failure recommendation may be based on the hardware failure simulation penalty score and may include the HBA-storage port configuration of a simulated enterprise network used in the failure simulation scenario.

The hardware failure recommendation may be outputted to the reporting module. Any number of hardware failure simulation scenarios may be used to determine any number of hardware failure simulation penalty scores. In some embodiments, any number of hardware failure simulation penalty scores may be a part of any number of hardware failure simulation recommendations. Any number of hardware failure recommendations may be outputted by the storage network traffic configuration system 170.

The storage network traffic configuration system may receive input from the IT administrator of the network. The input from the IT administrator may include a selection of a recommendation penalty. In some examples, the recommendation penalty may be one of: the total penalty score from the past data analysis, one of any number of standard deviation simulation penalty scores, one of any number of configuration simulation scenario penalty scores, or one of any number of hardware failure simulation penalty scores. An HBA-storage port configuration may be associated with the chosen recommendation penalty and the storage network traffic configuration system may send a change ticket to an IT management software platform such as ServiceNow to make any changes to the HBA, storage port, or switch fabric of the network.

Figure 2:
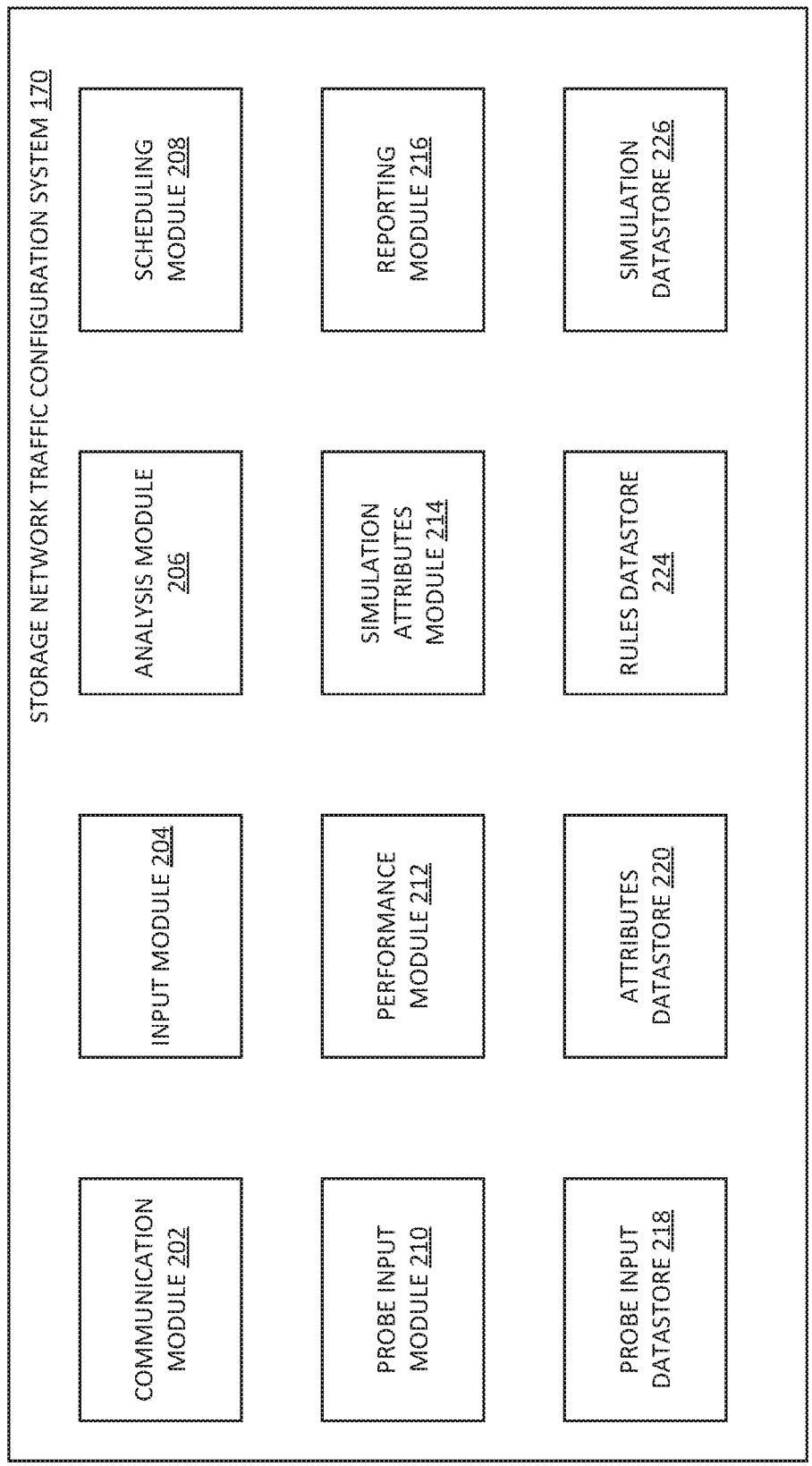
FIG. 2 depicts a block diagram of an example of a storage network traffic configuration system according to some embodiments.

FIG. 2 depicts a block diagram of an example of a storage network traffic configuration system 170 according to some embodiments. The storage network traffic configuration system 170 includes a communication module 202, an input module 204, an analysis module 206, a scheduling module 208, a probe input module 210, a performance module 212, a simulation attributes module 214, a reporting module 216, a probe input datastore 218, an attributes datastore 220, a rules datastore 224, and a simulation datastore 226.

The communication module 202 may send and receive requests or data between any of the storage network traffic configuration system, the probes 160, the TAP 140, and/or the switch fabric 130.

In some embodiments, the communication module 202 may receive a request from the IT administrator of the enterprise system 100 to initiate storage network traffic configuration process. The communication module 202 may send the initiation request received from the IT administrator to the scheduling module 208. In some embodiments, the communication module 202 may send the initiation request to the input module 204.

In various embodiments, the communication module 202 may send a request to schedule the storage network traffic configuration process to start at a specified day of the week and/or time of the day and/or duration. The communication module 202 may send the scheduled request received from the IT administrator to the scheduling module 208.

The communication module 202 may receive (e.g., from the scheduling module 208) a request to initiate the storage network traffic configuration process when a current time equals the beginning of the storage network traffic configuration time frame. The communication module 202 may send the request to initiate the storage network traffic configuration process to the analysis module 206.

In some examples, the communication module 202 may receive, from the IT administrator of the enterprise system 100 (or an authorized device associated with the enterprise system 100), a list of restricted ports, unused storage ports, and/or boundary conditions which may apply to one or more hosts, switches, and/or storage devices.

In some embodiments, the communication module 202 may facilitate the storage network traffic configuration process by sending a request from the analysis module 206 to the probes 160 for network data. In some embodiments, the communication module 202 may send the network data from the probes 160 to the analysis module 206.

For example, the communication module 202 may send a request to the SAN performance probe 162 for SAN data from any number of storage ports of the storage devices which make up the SAN. The SAN data may include, but is not limited to: storage port utilization, number of items in the queue of the storage port, and/or size of data requests received by any number of the storage ports of the storage devices which make up the SAN. The SAN performance probe 162 may monitor data traffic coming in and out of any number of SAN storage devices. The communication module 202 may send the SAN data to the probe input module 210.

In various embodiments, the communication module 202 may send a request to the network switch probe 164 for network data from the switch fabric 130. Attributes of the network data may include but are not limited to: read speed, write speed, and/or number of requests coming from each of any number of HBA or storage ports. The network switch probe 164 may monitor data traffic travelling through the network switch probe 164. The communication module 202 may send the network data to the probe input module 210. In some embodiments, the communication module 202 may send the network data from the network switch probe 164 to the analysis module 206.

The communication module 202 may send the received network data from the probes 160 to the analysis module 206 to perform past data analysis. Past data analysis may include determining the total penalty score based on any number of penalty rules and the weightings of any number of penalty rules. In various embodiments, the communication module 202 may receive, from the IT administrator of the enterprise 100 (or an authorized device associated with the enterprise system 100), rule weightings and time period weightings. Any number of penalty rules may be used by the analysis module 206 to perform past data analysis. The total penalty score may be the result of the past data analysis. The total penalty score may be outputted by the analysis module 206 as a part of a recommendation. The reporting module 216 may output to the IT administrator of the enterprise system 100 the recommendation. The recommendation may include, but is not limited to: the total penalty score, the score for each of any number of penalty rules, the weighting of each of any number of penalty rules, and/or the HBA-storage port configuration from points in time within the time frame to an user interface using a reporting module.

In various embodiments, the communication module 202 may send simulation attributes from the simulation attributes module 214 to the analysis module 206 to obtain recommendations for a future time. The communication module 202 may send to the reporting module 216 one or more recommendations for the future time to the reporting module 216.

In some examples, the communication module 202 may send a change ticket to ServiceNow to make any changes to the HBA, the storage port(s), and/or the switch fabric of the enterprise system 100 in response to feedback to the one or more recommendations for the future time. The feedback to the one or more recommendations for the future time may be received by the IT administrator, a user of the enterprise system 100, or an authorized device of the enterprise system 100. In various embodiments, the feedback to the one or more recommendations for the future time may be determined by the storage network traffic configuration system 170.

The input module 204 may receive a request to initiate the storage network traffic configuration process from the IT administrator of the enterprise system 100 (or an authorized device associated with the enterprise system 100). In some embodiments, the input module 204 may send the storage network traffic configuration process initiation request the analysis module 206. In some embodiments, the communication module 202 may facilitate the input module 204 to send the storage network traffic configuration process initiation request to the scheduling module 208.

The input module 204 may receive from the IT administrator (or an authorized device associated with the enterprise system 100) a time frame to schedule the storage network traffic configuration process.

The input module 204 may receive information from an IT administrator of the enterprise system 100 (or an authorized device associated with the enterprise system 100). The received information may include a list of any number of applications known to the user. The list may include data associated with any number of application such as names and/or tier mapping associated with each of any number of applications. The received information may include a second list including any number of entities of the enterprise system 100, and attributes associated with entities of the enterprise system 100 such as a network tier associated with the entity and/or name of the entity or type of entity. In some embodiments, metadata associated with entities of the enterprise system 100 may be different depending on the type of entity. Entities of the enterprise system 100 represent the physical and virtual entities of the enterprise network 105, and may include applications, compute devices, network elements and storage elements.

In some embodiments, the input module 204 may receive data regarding applications discovered by an IT management software platform such as ServiceNow. In various embodiments, data associated with applications discovered by ServiceNow, such as name of the application, entities associated with the application, and/or other attributes associated with the application.

The applications or business services may include, but are not limited to, email, web services, and front end servers. For example, servers, storage devices, and hosts associated with an email service for enterprise 100 may be discovered by ServiceNow. ServiceNow may output one or more entity identifiers associated with the email service, along with attributes of the entities. These attributes may include (or may be later associated with) tier mapping of the application associated with the entity. For example, an email service may be a tier 0, business critical application. Entities associated with email service may be assigned the same tier mapping as a part of their attributes.

An entity of the enterprise network 105 may be associated with multiple applications, each with their own associated tier attribute. In some embodiments, an entity associated with multiple applications with different tier mapping may be assigned the most critical tier attribute from among the theirs of the associated applications (e.g., the lowest tier attribute of the associated applications). For example, a particular server associated with the email service, which is assigned a tier 0 mapping is also associated with a SAP application with a tier 1 mapping, the particular server will be assigned the tier 0 mapping.

In various embodiments, the input module 204 may receive identifiers of any number of storage ports, HBA, and/or switch fabric to exclude from the storage network traffic configuration process. Storage ports may be restricted due to many reasons, including: dedication of certain storage ports for redundancy purposes and/or dedication of certain storage ports to be kept unused for future uninstalled applications. The input module 204 may send a request to store the data regarding restricted ports to the performance module 212. The performance module 212 may send to the analysis module 206 a listing any number of restricted ports to ignore in the storage network traffic configuration process.

In some embodiments, the input module 204 may receive from the IT administrator of the enterprise system 100, any number of penalty rule weightings. The reporting module 216 may output any number of penalty rules. In response, the IT administrator may input any number of penalty rule weightings according to any number of network factors. Network factors may include, but are not limited to: a prioritization of memory read over memory write, keeping the utilization of network entities on which mission-critical applications are running on at less than an utilization threshold, and dedicating certain network resources, such as one or more SAN, servers, and/or switches for applications of a certain tier mapping.

The input module 204 may receive from the IT administrator of the enterprise network 105 feedback from a chosen recommendation. The chosen recommendation being one of: any number of standard deviation simulation recommendations, any number of configuration simulation recommendations, and/or any number of hardware failure recommendations.

In response to the feedback from the chosen recommendation, the input module 204 may send a change ticket to ServiceNow to make changes to the HBA, the storage port or the switch fabric of the enterprise system 100. An HBA-storage port configuration may be associated with the feedback and the storage network traffic configuration system may send a change ticket to an IT management software platform such as ServiceNow to make any changes to an HBA, storage port, and/or switch fabric of the network.

The analysis module 206 may receive the request to initiate the storage network traffic configuration process from the scheduling module 208 and may execute the storage network traffic configuration process.

The analysis module 206 may receive (e.g., from the probe input module 210) network data from the probes 160. The network data may include, but is not limited to: SAN data and network data. The analysis module 206 may analyze the received network data and extract metadata associated with the network data such as attributes associated with the storage devices 110 and attributes associated with the source or destination of the data path such as the workload being generated by any number of HBAs attached to any number of storage ports or number of requests received by the storage port. The analysis module 206 may receive network data during the storage network traffic configuration time frame. The analysis module 206 may store or update the attributes associated with entities of the enterprise system 100 into attributes datastore 220. In some embodiments, the analysis module 206 may receive the network data directly from the probes 160.

The analysis module 206 may receive from the IT management software platform such as ServiceNow, data associated with application discovered by the IT management software platform. The data associated with applications discovered by the IT management software platform may include, but is not limited to: the attributes of the application such as name of the application, tier mapping of the application, entities associated with the application, and/or attributes of the entities associated with the application. The analysis module 206 may store or update the attributes associated with applications and entities of the enterprise system 100 into attributes datastore 220.

For example, the analysis module 206 may determine the infrastructure of the enterprise system 100. The infrastructure of the enterprise system 100 may aid users of the network monitoring system 150 with a visual representation of the infrastructure in the context of key applications of the enterprise 100 and entities of the enterprise system 100 associated with key applications. In some embodiments, the analysis module 206 may determine the HBA-storage port configuration of the enterprise system 100. The HBA-storage port configuration may be stored in the attributes datastore 220 and may be outputted to the reporting module 216 in the form of a chart or table.

Figure 6:
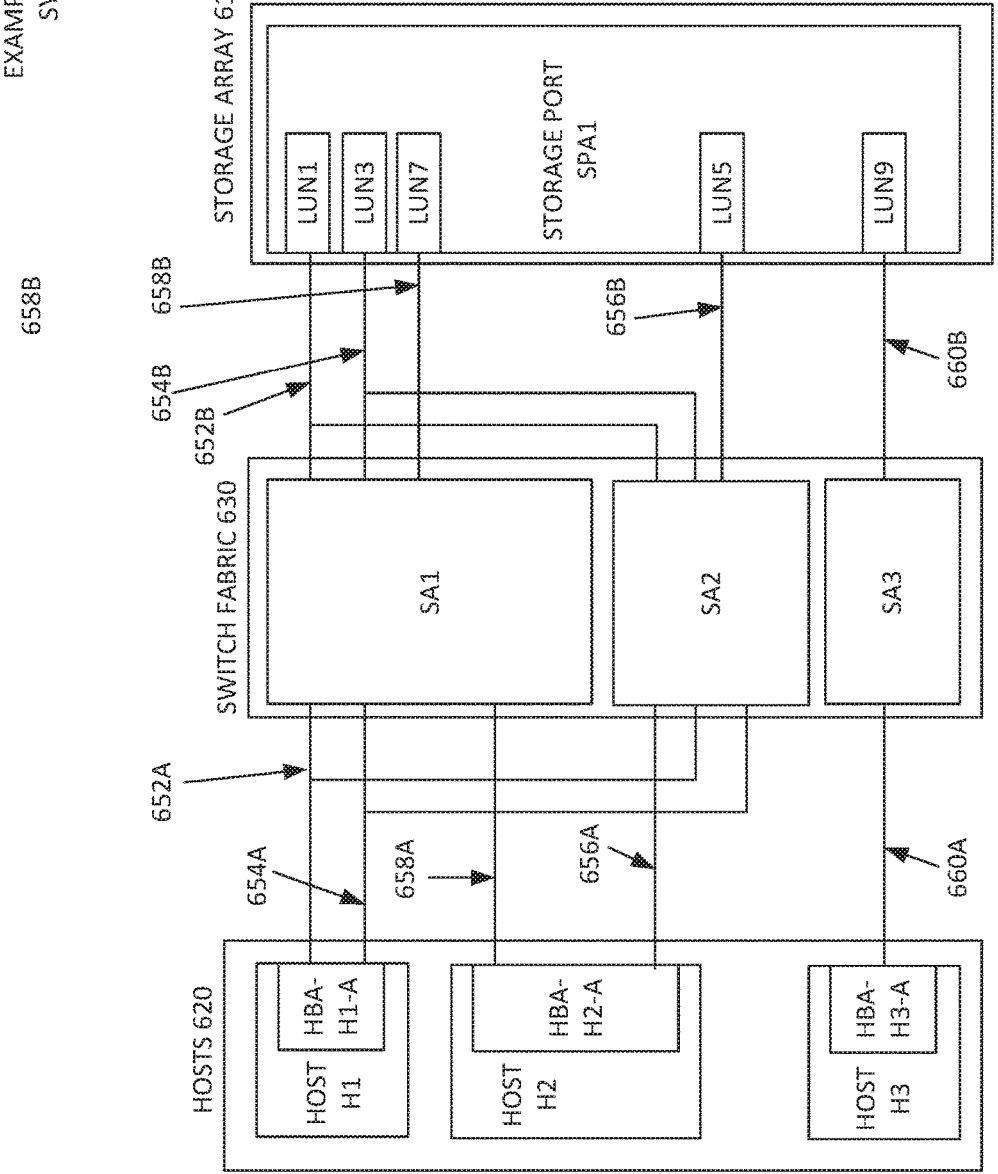
FIG. 6 is a block diagram of an example enterprise system according to some embodiments.

FIG. 6 is a block diagram of an example enterprise system 600 according to some embodiments. The enterprise system 600 comprises storage array 610, hosts 620 and switch fabric 630. Hosts 620 includes Host H1, Host H2, and Host H3 each host comprising HBA-H1-A, HBA-H2-A, and HBA-H3-A respectively. For illustration purposes, only one HBA is shown in each host, in reality, each host may include several HBAs.

Data path 1 from Table 1 is comprised of data segments 652A and 652B of FIG. 6. Data path 1 couples HBA port HBA-H1-A to the logical unit number (LUN) LUN1 via switch SA1 and SA2. Data path 2 from Table 1 is comprised of data segments 654A and 654B of FIG. 6. Data path 3 from Table 1 is comprised of data segments 656A and 656B of FIG. 6. Data path 4 from Table 1 is comprised of data segments 658A and 658B of FIG. 6. Data path 5 is comprised of data segments 660A and 660B, from Table 1 is comprised of data paths seen in FIG. 6 and listed in Table 1.

TABLE 1

HBA-Storage Port Configuration for Example Data Paths

| Path # | Host | HBA | Switch Fabric (Multiple Switches) | Storage Port | Array | LUN |
| --- | --- | --- | --- | --- | --- | --- |
| 1 | Host-H1 | HBA-H1-A | Switch-SA1 Switch-SA2 | SPA1 | ArrayA1 | LUN1 |
| 2 | Host-H1 | HBA-H1-A | Switch-SA1 Switch-SA2 | SPA1 | ArrayA1 | LUN3 |
| 3 | Host-H2 | HBA-H2-A | Switch-SA2 | SPA1 | ArrayA1 | LUN5 |
| 4 | Host-H2 | HBA-H2-A | Switch-SA1 | SPA1 | ArrayA1 | LUN7 |
| 5 | Host-H3 | HBA-H3-A | Switch-SA3 | SPA1 | ArrayA1 | LUN9 |

It will be appreciated that an enterprise network 105 may include thousands of hosts, tens of thousands of HBAs, hundreds of switch fabrics, hundreds of storage arrays with thousands of storage ports. A table similar to Table 1 listing all the different data paths would require extensive memory.

A separate set of data may be collected which maps the Application to the virtual machine (VM) and the VM to the host. The first few rows of a sample data set might look like the table below:

TABLE 2

| Application | VM | Host |
|---|---|---|
| CustomerOrders | VM-356 | Host-East-D |
| CustomerOrders | VM-987 | Host-East-E |
| EmployeePayroll | VM-374 | Host-East-D |
| CompanyWebsite | VM-873 | Host-East-J |
| Etc . . . (Hundreds to Thousands more rows would be typical) | | |

Other data collected is the mapping of applications to priorities. A sample data set might look like the table below:

TABLE 3

| Application | Priority Rank (1 is the highest, larger numbers demonstrate lesser importance) |
|---|---|
| CustomerOrders | 1 |
| CompanyWebsite | 2 |
| WarehouseInventoryApplication | 3 |
| EmployeePayroll | 4 |
| Etc . . . (Hundreds to Thousands more rows would be typical) | |

Some of the above data is obtained through software APIs. The next set of example data may come from one or more hardware probes which may passively reads meta-data off the fiber channel wire. This data may come in a format of type:

TABLE 4

| Beginning Timestamp | Ending Timestamp | Conversation Identifier | Read IO Size 0-1 KB count | Write IO Size 0-1 KB count | Read IO Size 1-2 KB count | Write IO Size 1-2 KB count | More Read IO Sizes and Write IO Sizes . . . |
|---|---|---|---|---|---|---|---|
| 1506090462 | 1506090463 | <Some ID Code> | 45423 | 0 | 678 | 0 | |
| 1506090463 | 1506090464 | <Some ID Code> | 2300012 | 45423 | 678 | 13455 | |
| 1506090464 | 1506090465 | <Some ID Code> | 0 | 2300012 | 45423 | 653635 | |
| 1506090465 | 1506090466 | <Some ID Code> | 678 | 0 | 2300012 | 45423 | |
| 1506090466 | 1506090467 | <Some ID Code> | 45423 | 13455 | 678 | 2300012 | |
| 1506090467 | 1506090468 | <Some ID Code> | 0 | 45423 | 53 | 45423 | |
| 1506090468 | 1506090469 | <Some ID Code> | 13455 | 0 | 45423 | 678 | |

This table is just for illustrative purposes.

The components are the timestamps showing the time range of the data collected, some conversation ID which is a way to link back the traffic being read from the wire to the components to which the wire is connected and a measure of the traffic which, in this case, is the relevant counts per IO size for both reads and writes. The counts of IO size are relative to a histogram binning system where the boundaries could be custom fitted but a sample boundary to the histogram might be 0 to 0.5 KB, 0.5 to 1 KB, 1 to 2 KB, 2 to 3 KB, 3 to 4 KB, 4 to 8 KB, 8 to 12 KB, 12 to 16 KB, 16 to 24 KB, 24 to 32 KB, 32 to 48 KB, 48 to 60 KB, 60 to 64 KB, 64 to 96 KB, 96 to 128 KB, 128 to 192 KB, 192 to 256 KB, 256 to 512 KB, 512 to 1024 KB and 1024 and above. This table enables the calculation of read and write throughput which is just the IOPS multiplied by its respective block size. (The upper limit of the histogram bin is used in the calculation.)

A final set of data collected for the purpose of some embodiments is the maximum traffic capacity for each port on the array. This data may be collected into a table that might look like:

TABLE 5

| Storage Port | Maximum Read Throughput | Maximum Write Throughput |
|---|---|---|
| StoragePortA1 | 800,000 KB/S | 800,000 KB/S |
| StoragePortA2 | 800,000 KB/S | 800,000 KB/S |
| StoragePortA3 | 800,000 KB/S | 800,000 KB/S |
| StoragePortA4 | 400,000 KB/S | 400,000 KB/S |
| StoragePortA5 | 400,000 KB/S | 400,000 KB/S |
| StoragePortA6 | 400,000 KB/S | 400,000 KB/S |
| StoragePortA7 | 400,000 KB/S | 400,000 KB/S |

With this data above, calculating each storage port utilization for both read and write is possible. Some embodiments have the mapping of all HBAs connected to the storage port, a method for calculating the current throughput and the maximum throughput the port can handle. Adding the traffic together for each port and dividing by the maximum gives the current port utilization. This can be done for both read and write traffic.

In various embodiments, the analysis module 206 may perform past data analysis process. The past data analysis process may include weighing any number of penalty rules according to any number of network factors. The output of the past data analysis process may be a recommendation which is based on a total penalty score.

Some examples of network factors include a prioritization of memory read over memory write, keeping the utilization of network entities on which mission-critical applications are running on at less than an utilization threshold, dedication of certain network resources, such as one or more SAN, servers and switches for applications of a certain tier mapping, and the like. In various embodiments, storage network traffic configuration system receive from the IT administrator of the network input values of any number of network factors. Using the input values of any number of network factors, any number of penalty rules may be weighted accordingly. In one example, the storage network traffic configuration system may have defaulted values for any number of network factors.

The table below shows an example total penalty score of the past data analysis, and any number of rules used in the past data analysis. As seen in the table below, some of the penalty rules include typical and maximum usage for memory reads and memory writes, workload divergence, tier sharing, buffer credit, HBA redundancy, and path/speed mismatch. Each of any number of penalty rules may be applied to some or all of the storage ports of the enterprise network 105. Each of these rules will be discussed in further detail.

Each row of table below shows the individual score for each of any number of penalty rules for each of any number of storage ports. The sum of the individual scores from each of any number of penalty rules are summed to obtain an aggregate penalty score. The sum of the individual score from each penalty is multiplied by the weighting to obtain the aggregate weighting. Any number of aggregate weighting, once associated with each of any number of penalty rules, are added together to obtain a total penalty score. The total penalty score is associated with the network data obtained during a particular time frame from the enterprise network 105 with a particular HBA-storage port configuration.

In the example shown in the table below, storage ports 1 through 7 may belong to the same storage device. Typically, a storage device, such as a storage array may include anywhere between 16 and 128 storage ports. The result penalty score in table form, similar to the table below, would require several tables for each storage device of a storage array, each table potentially containing hundreds of columns. The amount of memory required to save one table containing the individual penalty score for each of any number of storage ports from which network data was received from the probes 160 would be enormous.

The maximum utilization penalty (read & write) may be a penalty calculated based on checking every read utilization data for times during the time frame for a particular storage port and determining the maximum read utilization during the time frame. The maximum read utilization is entered into an equation to normalize the result across any number of storage ports.

$$\text{Utilization Penalty Max} = \frac{\left(\exp^{bx^2}\right) + cx}{a}$$

Where x is the maximum percent utilization divided by 100 and a, b, and c are utilization coefficients chosen such that when x=100, the maximum utilization penalty equals 1. In one embodiment, a=302, b=6, and c=100. In various embodiments, the analysis module 206 may store the values of the coefficients a, b, and c in the rules datastore 224. The utilization penalty max equation represents a penalty score that may rise linearly for utilizations below 50% and beings to rise exponentially as it approaches 100%. One score is for read utilization while a separate score is for write utilization. The analysis module 206 may calculate the maximum utilization penalty for read and write separately. In some embodiments, the analysis module 206 may calculate an individual penalty for each storage port, the individual penalty for each storage port of the enterprise network 105 can be summed to determine the aggregate score of the

TABLE 6

Example Penalty Rules and Total Penalty Score

| | Past Data Analysis (Penalty Scores) | | | | | | | | | |
|---|---|---|---|---|---|---|---|---|---|---|
| | Storage Ports | | | | | | | | | Aggregate |
| | 1 | 2 | 3 | 4 | 5 | 6 | 7 | Aggregate | Weighting | Weighting |
| Utilization Penalty Typical Usage (Read) | 0.5 | 0.4 | 0.8 | 0.6 | 0.9 | 0.1 | 0.3 | 3.6 | 2 | 7.2 |
| Utilization Penalty Typical Usage (Write) | 0.5 | 0.2 | 0 | 0 | 0.2 | 0.7 | 0.9 | 2.5 | 1 | 2.5 |
| Utilization Penalty Max Usage (Read) | 0.9 | 0.5 | 0.4 | 0.5 | 0 | 0.8 | 0.3 | 3.4 | 2 | 6.8 |
| Utilization Penalty Max Usage (Write) | 0.9 | 0.4 | 0.8 | 0.9 | 0.3 | 0.9 | 0.4 | 4.6 | 1 | 4.6 |
| Workload Divergence (Read) | 0.2 | 0 | 0.8 | 0.5 | 0.5 | 0.4 | 0.3 | 2.7 | 3 | 8.1 |
| Workload Divergence (Write) | 0.1 | 0.1 | 0 | 0.8 | 0.8 | 0.7 | 0.2 | 2.7 | 3 | 8.1 |
| Utilization per Tier Read Mismatch | 0.9 | 0.8 | 1 | 0.5 | 0.5 | 0.3 | 0.9 | 4.9 | 5 | 24.5 |
| Utilization per Tier Write Mismatch | 0.2 | 0.5 | 0.2 | 0.5 | 0.7 | 0.4 | 0.2 | 2.7 | 2 | 5.4 |
| Priority Tier Sharing Ports | 0.3 | 0.6 | 0.9 | 0.4 | 0.3 | 0.7 | 0.7 | 3.9 | 4 | 15.6 |
| Buffer Credit Problem Share | 0.1 | 0.2 | 0.9 | 0.6 | 0.3 | 0.3 | 0.8 | 3.2 | 1 | 3.2 |
| Failover Simulation HBA (Read) | 0.3 | 0.1 | 0 | 0.3 | 0.1 | 0.7 | 0.1 | 1.6 | 4 | 6.4 |
| Failover Simulation HBA (Write) | 0.3 | 0.1 | 0 | 0.3 | 0.1 | 0.7 | 0.1 | 1.6 | 2 | 3.2 |
| Failover Simulator Storage Port (Read) | 0.3 | 0.7 | 0.2 | 0.7 | 0.5 | 0.4 | 0.3 | 3.1 | 4 | 12.4 |
| Failover Simulator Storage Port (Write) | 0.3 | 0.7 | 0.2 | 0.7 | 0.5 | 0.4 | 0.3 | 3.1 | 2 | 6.2 |
| Path/Speed Mismatch for Upper Tiers | 0 | 0.1 | 0.7 | 0.5 | 0.1 | 0.7 | 0.7 | 2.8 | 1 | 2.8 |
| Total Penalty Score | | | | | | | | | | 107.6 | maximum utilization penalty for the storage device. In some embodiments, the analysis module 206 may store the aggregate score of the maximum utilization penalty in the simulations datastore 226.

The typical utilization penalty (read & write), may be similar to the maximum utilization penalty, except instead of determining the maximum utilization penalty for all times during the time frame per storage port, the typical utilization penalty determines the $75^{th}$ percentile of the read and write speed. The set of data points from the time frame are ordered in ascending order, and the $75^{th}$ percentile read and write data point is taken as x in the above equation. Other aspects of the equation may be the same, such as the utilization coefficients a, b, and c. In various embodiments, the analysis module 206 may store the values of the coefficients a, b, and c in the rules datastore 224.

Typical utilization may be calculated along with the maximum utilization penalty because a maximum utilization data point could be an anomaly which occurs once during the time frame, while the $75^{th}$ percentile data point represent a more accurate representation of high utilization of a storage port. In some embodiments, the utilization coefficients a, b, and c from the typical read utilization penalty equation is different from the utilization coefficients a, b, and c from the typical write utilization penalty equation. A typical utilization penalty is calculated for read and another one for write. In some embodiments, the analysis module 206 may calculate an individual penalty for each storage port, the individual penalty for each storage port of the enterprise network 105 can be summed to determine the aggregate score. In some embodiments, the analysis module 206 may store the aggregate score of the typical utilization penalty in the simulations datastore 226.

The workload divergence (read & write) is a penalty which may be determine for each storage port, a deviation of a size of data request over the time frame. This may be calculated by determining, for each storage port, the distribution of the size of data requests during each time segment of the time frame, the distribution of the time segment may be a predetermine time segment such as 0.5 second, 1 second, 30 seconds, 1 minute, etc. Determining the distribution of the size of data requests during each time segment may include summing, for each time segment, a distribution size histogram to create a time segment histogram. Any number of time segment histograms may be created with any number of time segments which make up the time frame. Any number of time segment histograms may be converted to any number of segment histogram data points. The standard deviation of the bin index number for all of any number of time segment histograms may be created and used to determine the workload divergence penalty. The standard deviation of the bin index number may be normalized across the total number of bins with the equation:

$$\text{Workload Divergence} = \frac{(\exp^{bx^2}) + cx}{a}$$

Where x is the standard deviation in terms of bins over the entire time frame divided by the total number of bins. When the standard deviation in terms of bins over the entire time frame is 0, the size of all of the data requests during the time frame for the port fell into the same histogram bin. The standard deviation in terms of bins over the entire time frame with the highest score may mean that the size of the data requests during the time frame, for that particular port, fell over a full range of histogram bins. The utilization coefficients a, b, and c for the workload divergence penalty equation mimic or differ from the maximum utilization penalty equations.

In various embodiments, the analysis module 206 may store the values of the coefficients a, b, and c in the rules datastore 224. One workload divergence penalty score may be calculated for read and another one for write. In some embodiments, the analysis module 206 may calculate an individual penalty for each storage port, the individual penalty for each storage port of the enterprise network 105 can be summed to determine the aggregate score. In some embodiments, the analysis module 206 may store the aggregate score of the workload divergence penalty in the simulations datastore 226.

The utilization per tier mismatch may be a penalty rule which penalizes applications of different tiers using the same storage port. Applications of the enterprise system 100 may utilize hardware in the storage array. Priority issues may arise when applications from different tiers are serviced by the same storage port. For example, if a host that services a tier 0 application, or a tier 0 host connects to a storage port which also services a tier 3 host, issues of priority will arise in deciding which host to give priority to and whether the storage port should be considered a tier 0 or tier 3 storage port. There is may be no clear answer and the idea of tiering for priority ultimately breaks down when storage ports host multiple tiers.

For example, an IT administrator of a hospital may not want an application for monitoring patients' vital signs (defined as a tier 0 application) and an internal email application (defined as a tier 2 application) to share the same storage port. A particular storage port service for both applications may not be able to prioritize data requests from the tier 0 application arriving to a particular storage port at the same time as data requests from the tier 2 applications. As a result, there may be a delay in fulfilling data requests for the tier 0 application. The penalty score adds a higher penalty to storage ports that share tiers when the tiers sharing the storage port are further apart. For example, a tier 0 application and a tier 3 application sharing a storage port would have a higher penalty score than a tier 1 application and a tier 2 application sharing another port.

$$\text{Score} = \frac{\frac{(\text{Max}(tierRank) - \text{Min}(tierRank))}{TTA} \exp\left(\frac{-1 * \text{Max}(tierRank) - \text{Min}(tierRank)}{\text{Max}(tierRank)}\right) * \left(\frac{TTA}{\text{Min}(tierRank)}\right)^2}{(TTA^2 - TTA) * \exp\left(-\frac{TTA - 1}{TTA}\right)}$$

Where Min(tierRank) represents the lowest numbered tier, for any given storage port, assuming that a tier 4 application and a tier 0 application are sharing that port, Min(tierRank)=0 and Max(tierRank)=4.

A utilization per tier mismatch penalty may be calculated for read and another one for write. In some embodiments, the analysis module 206 may calculate an individual penalty for each storage port, the individual penalty for each storage port of the enterprise network 105 can be summed to determine the aggregate score. In some embodiments, the analysis module 206 may store the aggregate score of the utilization per tier penalty in the simulations datastore 226.

The buffer credit penalty may be a rule which penalizes any device coupled to a storage port that has a buffer credit problem. As implied by the name, the buffer credit problem may be a measure of how large the receiving device's buffer is. Buffer credit is a means of link-level flow control in a storage network, and is not a means to measure end-to-end data flow. For example, with a data request from a host to a storage array, an HBA of the host, with ten buffer credits, will send a data request, and the HBA's buffer credit will decrement by one. The data request will be sent to a next hop, the next port may be a switch, once the switch receives the data request and sends it off to the next hop, which may be another switch or a storage port of a storage array, the switch give the buffer credit back to the HBA again. If a particular HBA ever needs to send 11 data requests, the HBA will send off ten data requests using the HBA's 10 buffer credits, and wait for one buffer credit to be sent back to the HBA before sending the 11$^{th}$ data request.

There may be issues with a current HBA-storage port configuration if one or more slow draining devices is not able to process data requests at the same speed as other devices. If a slow draining device exists it should not share a storage port with high tier applications. If a buffer credit problem is detected at a storage port, it can be quantified by:

$$\text{Buffer Credit Score} = \frac{1}{\min(\text{tier ranking of tiers service by this storage port})}$$

A buffer credit penalty of 0 may be assigned to all storage ports that did not service a device with a buffer credit problem during the time frame. A buffer credit of 1 may be assigned to a tier 1 storage port servicing a device with a buffer credit problem, a buffer credit of 0.5 may be assigned to a tier 2 storage port serving a device with a buffer credit problem. In some embodiments, the analysis module 206 may calculate an individual penalty for each storage port, the individual penalty for each storage port of the enterprise network 105 can be summed to determine the aggregate score. In some embodiments, the analysis module 206 may store the aggregate score of the buffer credit penalty in the simulations datastore 226.

The failover simulator HBA (read & write) may use scoring similar to the maximum utilization penalty scoring, except this penalty scores HBA failures. A single host may comprise multiple HBA's. One reason for this is to prevent a single HBA failure from resulting in the failure of the host and possibly the entire enterprise network 105. In order to avoid a potential HBA failure from resulting in the failure of a host, the analysis module 206 simulates, for each of any number of HBA in the enterprise network 105, an HBA as broken. In the simulation, the broken HBA's data traffic may be distributed among the remaining HBAs. The analysis module 206 may calculate the maximum utilization penalty usage of the remaining HBAs and the average maximum utilization penalty usage may be used as the penalty score for the HBA simulated to be broken. One failover simulator HBA penalty score may be calculated for read and another one for write. In some embodiments, the analysis module 206 may calculate an individual penalty for each HBA. The individual penalty for each HBA of the enterprise network 105 can be summed to determine the aggregate score. In some embodiments, the analysis module 206 may store the aggregate score of the failure simulator HBA penalty in the simulations datastore 226.

The failover simulator storage port may be similar to the failover HBA penalty rule except this penalty utilizes a simulation to artificially create failure in each of any number of storage ports in the enterprise network 105 and calculate the maximum utilization penalty usage for the remaining storage ports. The failure simulator storage port for each of any number of storage ports may be calculated by:

$$\text{Score} = \frac{1}{n(n-1)} \sum_{f=1}^{n} \sum_{i=1, i \neq f}^{n} u(i, f) * w(i)$$

Where n is the total number of storage ports, u(i,f) calculates that utilization of storage port i, given the absence of storage port f, w(i) is a weighting term. In some embodiments, w(i) equals 1 for all storage ports. In various embodiments, w(i) may be a weighting based on the storage port services to prioritize higher tier traffic. One failover simulator storage port penalty score is calculated for read and another one for write. In some embodiments, the analysis module 206 may calculate an individual penalty for each storage port, the individual penalty for each storage port of the enterprise network 105 can be summed to determine the aggregate score.

Each data segment from one piece of hardware of the enterprise network to another has a maximum speed known as a link speed. If all the end to end connections of a data path do not have the same link speed, errors can arise, over time, as one part of the link cannot keep up with the other parts. To manage costs, corporations generally would not discard slower, but functioning hardware, so this path/speed mismatch is something that is a common occurrence. The penalty for a path/speed mismatch can be calculated by:

$$\text{Score} = \text{speed}(x_1, x_2, x_3 \ldots) * \frac{1}{\min(tierServiced)^2}$$

where $$\text{speed}(x_1, x_2, x_3 \ldots) = \begin{cases} 0 \text{ when all the speeds are equal} \\ 1 \text{ otherwise} \end{cases}$$

In some embodiments, the analysis module 206 may calculate an individual penalty for each storage port, the individual penalty for each storage port of the enterprise network 105 can be summed to determine the aggregate score. In some embodiments, the analysis module 206 may store the aggregate score of the path/speed mismatch penalty in the simulations datastore 226.

Each of any number of total penalty scores are multiplied by a weighting to obtain any number of aggregate weighting penalty scores. The weighting represents the importance of each penalty rule. The analysis module 206 may store each of any number of weightings in the simulations datastore 226. In some embodiments, the penalty rule weighting may be based on any number of network factors such as prioritizing memory reads over memory writes, keeping the utilization of network entities on which mission-critical applications are running on at less than an utilization threshold, dedicating certain network resources, such as one or more SAN, servers and switches for applications of a certain tier mapping, and the like.

Each of any number of aggregate weighting penalty scores may be summed together to obtain a total penalty score. The result of the past data analysis may be a baseline recommendation, the baseline recommendation may include, but is not limited to a total penalty score for that time frame. The analysis module 206 may store the baseline recommendation and the total penalty score in the simulations datastore 226. The total penalty score may be used as a baseline as a comparison for recommendations of HBA-storage port configuration for a future time. There may be many ways of coming up with the one or more recommendations of HBA-storage port configuration including: calculation of a standard deviation for each metric, simulation of various HBA-storage port configurations, and/or simulation of hardware failures.

The analysis module 206 may determine any number of recommendations of HBA-storage port configurations for a future time by calculating the standard deviation for each metric of the enterprise network 105. For example, the analysis module 206 may send a request to the simulation attributes module 214 to create simulated traffic based on the $1^{st}$, $2^{nd}$, and $3^{rd}$ standard deviations of each metric of the enterprise network 105. The metrics may include, but is not limited to: maximum read speed, or typical write speed, utilization usage for read and write, and/or priority tier sharing ports. The standard deviations of one or more metrics may be added to different data paths of the network to create any number of standard deviation simulation scenarios based on the $1^{st}$, $2^{nd}$, and/or $3^{rd}$ standard deviation of one or more metric. The standard deviation simulation scenarios may be stored in the simulation datastore 226.

The analysis module 206 may send a request to the simulation datastore 226 for one of any number of standard deviation simulation scenario created by the simulation attributes module 214. For example, the simulations attributes module 214 may identify one or more data paths of the network associated with a tier 0, business critical application and add a $1^{st}$, $2^{nd}$, or $3^{rd}$ deviation of a metric. The analysis module 206 may apply the past data analysis on one of any number of standard deviation simulation scenario to determine a standard deviation simulation penalty score. The standard deviation simulation penalty score may be stored in the simulation datastore 226.

A standard deviation recommendation may be based on the standard deviation simulation penalty score and may include the HBA-storage port configuration of a simulated enterprise network used in the standard deviation simulation scenario created by the simulation attributes module 214. Any number of standard deviation recommendations may be generated by the simulation attributes module 214 based on any number of standard deviation simulation scenarios. Any number of standard deviation recommendations may be outputted by the reporting module 216.

The analysis module 206 may determine any number of recommendations of HBA-storage port configurations for a future time by iterating through potential changes and performing simulations of various HBA-storage port configurations. For example, the analysis module 206 may send a request to the simulation attributes module 214 to create a first configuration simulation scenario. The configuration simulation scenario may change the connection of some number of HBAs to different storage ports from the enterprise network 105, thereby changing one or more data paths.

The analysis module 206 may determine a first total configuration simulation penalty score for the first configuration simulation scenario. If the first total configuration simulation penalty score is lower than the total penalty score from the baseline than it may be considered as an optimal simulation configuration, and may be the basis of subsequent configuration simulation scenarios. If the first total configuration simulation penalty score is equal to or higher than the total penalty score from the baseline, then the baseline HBA-storage port configuration may be considered the optimal simulation configuration.

The analysis module 206 may continue to send requests to the simulation attributes module 214 to create subsequent configuration simulation scenarios may be based on the optimal simulation configuration. This process may continue until a predetermined simulation configuration penalty score is reached, or a predetermine number of simulation configuration scenarios is reached. In some embodiments, the predetermined simulation configuration penalty score and/or the predetermine number of simulation configuration scenarios is set by the IT administrator or may be set by the network monitoring system 150.

Any number of configuration simulation scenarios may be stored in the simulation datastore 226. A number of factors may be taken into account to create different configuration simulation scenarios, such as configuring entities of the enterprise network 105, such as HBA, fabric switch, or storage ports so that utilization of these entities are below a utilization threshold.

In some embodiments, an HBA utilization threshold may be set by the IT administrator. In various embodiments, an HBA utilization threshold may be dependent on highest tier associated with a HBA port. For example, a HBA port of a host associated with a tier 1 application may have a lower HBA utilization threshold than a HBA port associated with a tier 3 application.

In some embodiments, a storage port utilization threshold may be set by the IT administrator. In various embodiments, the storage port utilization threshold may be dependent on the highest tier associated with the storage device. For example, a storage port of a storage device associated with a tier 0 application may have a lower storage port utilization threshold than a storage port of a storage device associated with a tier 4 application.

In the example enterprise system 600, the past data analysis may determine that the utilization of switch SA2 is greater than a HBA utilization threshold. The simulation attributes module 214 may create a HBA-storage port configuration simulation scenario in which data path 658, in which, as illustrated couples HBA port HBA-H2-A to LUN7 via switch SA2 is replaced by a hypothetical data path in which HBA port HBA-H2-A is coupled to LUN7 via switch SA3 (connection not shown).

This simulation HBA-storage port configuration may be stored in as a part of a configuration simulation scenarios in the simulation datastore 226. In some embodiments, the storage network traffic configuration system may take into account one or more factors and randomize HBA-storage port configurations to create one or more configuration simulation scenarios.

In various embodiments, other factors may be taken into account to determine different HBA-storage port configuration include taking into account restricted storage ports, unused storage ports, and/or boundary conditions. The IT administrator of the network may restrict storage ports for purposes of redundancy and disaster recovery. The IT administrator of the network may enforce restrictions and now allow an HBA to connect a data path to a completely unused storage port. Boundary conditions may be employed include the total number of rearrangements suggested by configuration simulation scenarios.

The analysis module 206 may apply the past data analysis on one of any number of configuration simulation scenario to determine a configuration simulation penalty score. The analysis module 206 may apply the past data analysis on any number of configuration simulation scenarios to determine any number of configuration simulation penalty scores by applying the past data analysis plurality of configuration simulation scenarios. Any number of configuration simulation recommendations includes at least each of any number of configuration simulation penalty scores. Any number of configuration simulation recommendations may be stored in the simulation datastore 226.

The analysis module 206 may determine a recommendation of the HBA-storage port configuration for the future time by performing simulations of hardware failures. For example, the analysis module 206 may send a request to the simulation attributes module 214 to create any number of hardware failure simulation scenarios. Each of any number of hardware failure simulation scenarios may comprise an HBA-storage port configuration in which one or more of a combination of HBA, switch fabric, and/or storage port failure simulations. Any number of hardware failure simulation scenarios may be stored in the simulation datastore 226.

The analysis module 206 may calculate the redistribution of the data traffic by applying one of any number of hardware failure simulation scenario to the enterprise system 100.

In the example enterprise system 600, the simulation attributes module 214 may create a hardware failure simulation scenario in which switch SA2 fails. The analysis module 206 may apply the past data analysis on one of any number of hardware failure simulation scenarios to determine any number of hardware simulation penalty score. The configuration simulation penalty score may be stored in the simulation datastore 226.

The network data received by the probe input module 210 data may be used along with the hardware failure simulation scenario to determine a hardware failure simulation penalty score. A hardware failure recommendation may be based on the hardware failure simulation penalty score and may include the HBA-storage port configuration of a simulated enterprise network used in the failure simulation scenario. Any number of hardware failure simulation scenarios may be used to determine any number of hardware failure scenario penalty scores. Any number of hardware failure scenario penalty scores and the associated HBA-storage port configurations may be stored in simulation datastore 226. Any number of hardware failure scenario penalty scores may be outputted by the reporting module 216.

The analysis module 206 may perform any of these operations manually (e.g., by a user interacting with a GUI) and/or automatically (e.g., triggered by one or more of the modules 206-216, discussed herein). In some embodiments, the analysis module 206 comprises a library of executable instructions, which are executable by one or more processors for performing any of the aforementioned management operations. Like the other modules described herein, some or all of the functionality of the analysis module 206 may be implemented and/or included within one or more other modules and/or systems.

In some embodiments, the scheduling module 208 may receive from the input module 204, the storage network traffic configuration process and determine a start and an end of the storage network traffic configuration time frame.

The probe input module 210 may receive network data from the probes 160. The network data including SAN data and network data. The network data may be analyzed to determine attributes of the network data. The attributes of the network data may include, but is not limited to: read speed, write speed, response time, and/or the number of items sitting in the queue. The probe input module 210 may store the network data in probe input datastore 218.

The performance module 212 may receive from the input module the listing of any number of restricted storage ports to be excluded from the storage network traffic configuration process. Some storage ports may be restricted for many reasons, including: dedicating certain storage ports to replication and intentionally keeping some of the storage ports unused for future uninstalled applications.

The simulation attributes module 214 may create any number of standard deviation simulation scenarios, configuration simulation scenarios, and hardware failure simulation scenarios. The simulation attributes module 214 may store the different simulation scenarios in the simulation datastore 226.

Each of any number of standard deviation simulation scenarios may be based on standard deviations of one or more metrics of the enterprise network 105. Each of any number of configuration simulation scenarios may simulation a change in the HBA-storage port configuration of the enterprise network 105. Any number of configuration simulation scenarios may be specified by the IT administrator, determined by the analysis module 206 by taking into consideration one or more network factors, or randomized HBA-storage port configurations. Each of any number of hardware failure simulation scenarios may comprise an HBA-storage port configuration in which one or more of a combination of HBA, switch fabric or storage port failure simulations.

The reporting module 216 may output an user interface. The user interface may provide a graphical user interface (GUI) to output a HBA-storage port configuration of the entire enterprise network, or a subset of the enterprise network 105. In some embodiments, the reporting module 216 outputs the infrastructure of the enterprise network 105 in the form of an application topology or an infrastructure topology.

The reporting module 216 may output any number of penalty rules which make up a part of the past data analysis and the result of some or all of the aggregate, weighting and aggregate weighting of some or all of the penalty rules for some or all of the storage ports of the enterprise network 105. The reporting module 216 may output to the user of the enterprise network 105, a GUI allowing the user to choose the one or more penalty rules, and/or one or more storage ports the user would like to be outputted by the reporting module 216.

The reporting module 216 may output any number of recommendations to the IT administrator of the enterprise network 105. Any number of recommendations may include: the baseline recommendation, any number of standard deviation simulation recommendations, any number of configuration simulation recommendations, and/or any number of hardware failure recommendations.

In some examples, the reporting module 216 may output total penalty scores associated with each of any number of recommendations. The total penalty scores may include the baseline penalty score, any number of standard deviation simulation penalty scores, any number of configuration simulation scenario penalty scores, and/or the hardware failure recommendation penalty scores along with their respective HBA-storage port configuration.

In various embodiments, the reporting module 216 may output a reconfiguration recommendation to the enterprise network 105 to move one or more HBA to a different storage port. The reconfiguration recommendation may be outputted by the reporting module 216 in the form of a table. Table 7 (below) is an example reconfiguration recommendation table for an example enterprise network 105.

TABLE 7

Example of Reconfiguration Recommendation

| HBA Name | Storage Port HBA is currently connected to | Recommended reconfiguration of HBA |
|---|---|---|
| Hostcust1-HBA-A | Array1-SP1A | Array1-SP7A |
| HostcustT3-HBA-B | Array1-SP1B | Array1-SP8B |
| Hostcust7-HBA-A | Array1-SP1A | Array1-SP12B |

The probe input datastore 218 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The probe input datastore 218 may store network data from the probes 160. The probe datastore 218 may receive the network data from the probe input module 210. In some embodiments, the probe input datastore may receive the network data from the SAN performance probe 162 or the network switch probe 164 directly.

The attributes datastore 220 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The attributes datastore may receive from the analysis module 206 a request to store attributes associated with entities of the enterprise network 105. Attributes associated with the source or destination of the data path may include buffer credits, number data requests generated or received per second, and/or workload generated by any number of HBAs attached to any number of storage ports. In some embodiments, data associated with the past data analysis may be stored in the attributes datastore 220. The data associated with the past data analysis may include, but is not limited to: data from Table 1 and Table 2.

The rules datastore 224 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The rules datastore 224 may store any number of penalty rules used in the past data analysis. In some embodiments, the coefficients a, b, c used in some of any number of penalty rules are stored in the rules datastore 224.

The simulation datastore 226 may be any structure and/or structures suitable for storing data entries or records (e.g., an active database, a relational database, a self-referential database, a table, a matrix, an array, a flat file, a documented-oriented storage system, a non-relational No-SQL system, an FTS-management system such as Lucene/Solar, and the like). The simulation datastore 226 may store the results of the past data analysis. The simulation datastore 226 may store any number of standard deviation simulation scenarios and their associated HBA-storage port configuration and any number of standard deviation penalty scores. In various embodiments, the simulation datastore 226 may store any number of configuration simulation scenarios, their associated HBA-storage port configuration(s), and any number of configuration penalty scores. For example, the simulation datastore 226 may store any number of hardware failure simulation scenarios as well as their associated HBA-storage port configuration and any number of hardware failure penalty scores.

A module may be hardware or software. In some embodiments, the module may configure one or more processors to perform functions associated with the module. Although different modules are discussed herein, it will be appreciated that the content delivery system 106 may include any number of modules performing any or all functionality discussed herein.

Figure 3:
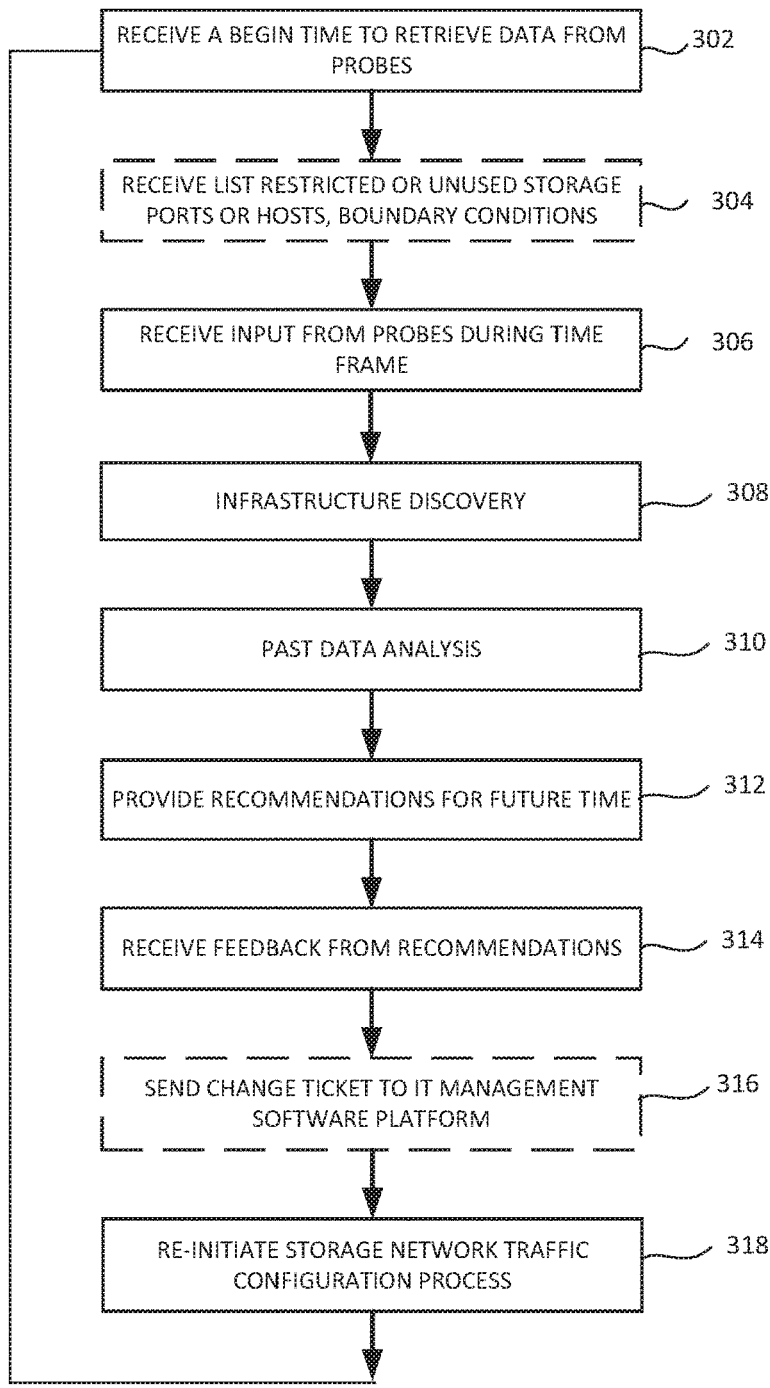
FIG. 3 depicts a flowchart of a storage network traffic configuration process of an enterprise system according to some embodiments.

FIG. 3 depicts a flowchart of a storage network traffic configuration process 300 of an enterprise system according to some embodiments. In step 302, the input module 204 may receive from the IT administrator(or an authorized device associated with the enterprise system 100), a begin time to retrieve data from probes 160 for network data. In some embodiments, the input module 204 may receive from the IT administrator a request to schedule the storage network traffic configuration process to start at a specified day of the week and/or time of the day and/or duration. The communication module 202 may facilitate the communication between the input module 204 and the scheduling module 208 by sending the storage network traffic configuration process request from the input module 204 to the scheduling module 208. In some embodiments, the communication module 202 may send the scheduled request received from the IT administrator to the scheduling module 208.

When the scheduling module 208 determines that the current time equals the beginning of the storage network traffic configuration process time frame step 304 may proceed. The communication module 202 may send the request to initiate the storage network traffic configuration process from the scheduling module 208 to the analysis module 206.

In optional step 304, the input module 204 may receive from the IT administrator of the enterprise network 105 (or an authorized device associated with the enterprise network 105), a list of restricted ports, unused storage ports, and boundary conditions that may exist. The IT administrator/authorized device of the network may restrict storage ports for purposes of redundancy and disaster recovery. The IT administrator/authorized device of the network may enforce restrictions and not allow an HBA to connect a data path to a completely unused storage port. Boundary conditions may be employed include the total number of rearrangements suggested by configuration simulation scenarios.

In step 306, the communication module 202 may facilitate the storage network traffic configuration process by sending a request from the analysis module 206 to the probes 160 to receive network data (or to a database that stores network data from the probes 160). The probes 160 may receive the request for network traffic data from the analysis module 206. The network data includes SAN data and network data. The probe input module 210 may continue to receive network data from the probe 160 until the end of the time frame (or receive stored network data from a database for the specified time frame).

For example, the communication module 202 may send a request from the analysis module 206 to the SAN performance probes 162 for SAN data from each of any number of storage ports of the storage devices which make up the SAN. The attributes of the SAN data may include storage port utilization, read speed, write speed, response time, workload being generated by each HBA coupled to the storage port, tier number of the application associated with the data request and how large the incoming or outgoing data requests are. The SAN performance probes 162 enable the creation of detailed histogram reports that provide real-time performance of input/output (I/O) workload distribution statistics for every data exchange going in and out of the SAN. The SAN performance probes 162 may send the SAN data to the probe input module 210.

In some embodiments, the communication module 202 may send a request from the analysis module 206 to the network switch probe 164 for network traffic data from the switch fabric. Attributes of the network data may include read speed, write speed, port type, number of CRC errors, buffer credits used/remaining, and/or port utilization. The network switch probe 164 may discover and present to the analysis module 206 entities (e.g., entity identifiers identifying entities) of the enterprise network 105 to aid in building an infrastructure topology. The entities of the enterprise network 105 may include physical fabric, logical fabric, physical switches, logical switches, blades and switch ports. The network switch probe 164 may send the network data to the probe input module 210.

In optional step 308, the analysis module 206 may send a request to the probe input module 210 for data for the analysis module 206 to determine the infrastructure of the enterprise network 105. In some embodiments, the analysis module 206 determines attributes of the entities of the enterprise network 105 and sends the entity attributes to the attributes datastore 220. The analysis module 206 may aid users of the network monitoring system 150 with a visual representation of the infrastructure in the context of key applications of the enterprise system 100. In some embodiments, the analysis module 206 may output the visual representation of the infrastructure in the form of an application topology or an infrastructure topology. The application topology shows a representation of the entities associated with a particular application and how the entities are coupled to each other. The infrastructure topology shows a representation of a particular entity of the enterprise network 105 and the entities of the enterprise network that particular entity is connected to.

In step 310, the analysis module 206 may analyze the data retrieved from the probes 160 to determine attributes of the using past data analysis. In some embodiments, the analysis module 206 does not begin to analyze the network data until the end of the time frame. In various embodiments, the analysis module 206 analyzes the network data as it is being received by the probe input module 210. Further details of step 310 can be seen in steps 510 through 516 of FIG. 5.

Figure 4:
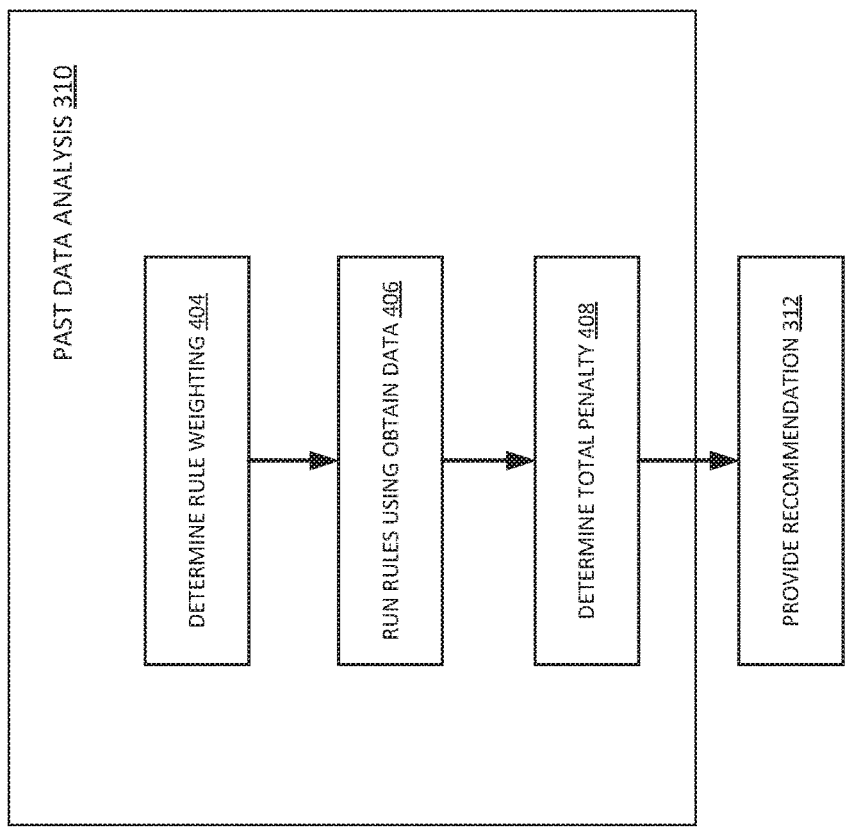
FIG. 4 depicts a flow chart of one step of the storage network traffic configuration, illustrating the past data analysis in further detail according to some embodiments.

FIG. 4 is a flow chart of the analysis of the data discussed with regard to step 310 retrieved from probes in some embodiments. In step 404 of FIG. 4, the simulation attributes module 214 may determine the weighting of any number of penalty rules according to any number of network factors. Any number of network factors may include, but is not limited to: a prioritization of memory read over memory write, keeping the utilization of network entities on which mission-critical applications are running on at less than an utilization threshold, and dedicating certain network resources, such as one or more SAN, servers and switches for applications of a certain tier mapping. In some embodiments, the IT administrator may choose to implement the entire set or a subset of any number of penalty rules on the data retrieved during the time frame.

In step 406 of FIG. 4 the analysis module 206 may apply weighting using any number of penalty rules. In some embodiments, the weighting applied to each of any number of penalty rules may be individually set by the IT administrator and/or authorized device. The reporting module 216 may output any number of penalty rules to the IT administrator and/or authorized device, in response, the IT administrator and/or authorized device may input weighting values for any number of penalty rules. In some embodiments, analysis module 206 may apply defaulted weigh values for each of any number of penalty rules.

The example of Table 2 above shows the individual score for each of any number of penalty rules for each of the storage ports on the same storage device. For simplicity, only 7 ports are shown, in reality, a storage array may comprise anywhere between 16 and 128 storage ports. Some of any number of penalty rules include typical and maximum utilization penalty rules, one for memory reads and one for memory writes. The analysis module 206 determines the maximum utilization penalty for any given storage port for the time frame by calculating the utilization penalty equation:

$$\text{Utilization Penalty Max} = \frac{\left(\exp^{bx^2}\right) + cx}{a}$$

Where x is maximum percentage utilization of the read or write divided by 100 for the given storage port during the time frame. Utilization coefficients a, b, and c are chosen such that when x=100, the utilization penalty from the equation above equals 1.

In some embodiments, the utilization coefficients a, b, and c as calculated above for maximum utilization penalty for memory read is used for all memory read penalty equations in which utilization coefficients a, b, and c are used. Utilization coefficients a, b, and c as calculated for maximum utilization penalty for memory write is used for all memory write penalty equations in which utilization coefficients a, b, and c are used. In various embodiments, utilization coefficients a, b, and c as calculated for any one of the penalty rules in which utilization coefficients are used by all of the penalty rules in which utilization coefficients a, b, and c are used. For example, a=302, b=6, and c=100. The utilization coefficient may be stored in the simulation datastore 226.

In some embodiments, the typical utilization penalty applies the same utilization penalty equation above, except x equals the 75$^{th}$ percentile of the read or write speed. The typical utilization penalty above may represent a more accurate representation of high memory read or memory write utilization of a storage port. The maximum utilization memory read or memory write, which is used for the maximum utilization penalty score, may be an anomaly which occurs once during the time frame. The analysis module 206 may calculate the typical and maximum utilization penalty score for each of any number of storage ports in the enterprise network 105 for both memory reads and memory writes. An aggregate typical utilization penalty score for memory read can be calculated by summing the typical utilization penalty score for each of any number of storage ports in the enterprise network 105. A weighted aggregate typical utilization penalty score for memory read can be calculated by multiplying the aggregate typical utilization penalty score by the weight applied to the penalty score. Similarly, an aggregate typical utilization penalty score for memory write can be determined and an aggregate maximum utilization penalty score for memory read and memory write can be calculated.

The analysis module 206 may calculate the individual workload divergence penalty for each of any number of storage ports of the storage devices 110 of the enterprise network 105. The workload divergence penalizes a storage port when there is a deviation in the size of data requests during the time frame. The analysis module 206 calculates an aggregate workload divergence penalty by summing the individual divergency penalty for each of any number of storage ports. The analysis module 206 may calculate a weighted aggregate workload divergence penalty score by multiplying the aggregate workload divergence penalty score by the weight applied to the penalty score.

The analysis module 206 may calculate the utilization per tier mismatch, a penalty rule which penalizes applications of different tiers using the same storage port. Priority issues arise when applications from different tiers are serviced by the same storage port. Ideally, applications of the same tier would share the same host, switch and storage array, however, that is usually not the case.

The penalty equation used to calculate the utilization per tier such that a higher penalty is obtained when a storage port is shared by application tiers that are further apart, for example, a tier 1 application and a tier 4 application sharing a storage port would have a higher penalty score than a tier 3 application and tier 4 application sharing another port. The analysis module 206 may calculate an individual utilization per tier mismatch penalty for each of any number of storage ports with the equation:

$$\text{Score} = \frac{\frac{(\text{Max}(tierRank) - \text{Min}(tierRank))}{TTA} \exp\left(\frac{-1 * \text{Max}(tierRank) - \text{Min}(tierRank)}{\text{Max}(tierRank)}\right) * \left(\frac{TTA}{\text{Min}(tierRank)}\right)^2}{(TTA^2 - TTA) * \exp\left(-\frac{TTA - 1}{TTA}\right)}$$

Where Min(tierRank) represents the lowest numbered tier, for any given storage port, assuming that a tier 4 application and a tier 0 application are sharing that port, Min(tierRank)=0 and Max(tierRank)=4. The analysis module 206 calculates an aggregate utilization per tier penalty by summing the individual utilization per tier mismatch penalty for each of any number of storage ports. The analysis module 206 may calculate a weighted aggregate utilization per tier mismatch penalty score by multiplying the aggregate utilization per tier penalty score by the weight applied to the penalty score.

The buffer credit penalty is a rule which penalizes any device coupled to a storage port that has a buffer credit problem. The penalty rule attempts to identify slow draining devices which may be causing a bottleneck in the enterprise network 105. The analysis module 206 may use the equation below to quantify an individual buffer credit penalty for each of any number of storage ports in the enterprise network 105:

$$\text{Buffer Credit Score} = \frac{1}{\min(\text{tier ranking of tiers service by this storage port})}$$

In some embodiments, the analysis module 206 may determine that all storage ports that did not service a device with a buffer credit problem during the time frame has a buffer credit penalty of 0. The analysis module 206 may determine that storage ports that serviced a tier 1 storage port with a buffer credit problem during the time frame has a buffer credit penalty of 0.5 and so on. The analysis module 206 calculates an aggregate buffer credit penalty by summing the individual buffer credit penalty for each of any number of storage ports. The analysis module 206 may calculate a weighted aggregate buffer credit penalty score by multiplying the aggregate buffer credit penalty score by the weight applied to the penalty score.

The analysis module 206 may calculate a failover simulator penalty for each of any number of HBAs in the enterprise network 105 by simulating, for each of any number of HBA in the enterprise network 105, a broken HBA, and distributing the broken HBA's data traffic among the remaining HBAs. The analysis module 206 may calculate the maximum utilization penalty usage of the remaining HBAs and the average maximum utilization penalty usage is used as an individual failover simulator penalty score for the HBA simulated to be broken. The analysis module 206 calculates an aggregate failover simulation HBA penalty by summing the individual failover simulation HBA penalty for each of any number of HBAs. The analysis module 206 may calculate a weighted aggregate failover simulation HBA penalty score by multiplying the aggregate failover simulation HBA penalty score by the weight applied to the penalty score. In some embodiments, the analysis module 206 may use a similar method to determine the read and write failover simulation penalty scores for HBAs.

Similar to the failover simulation HBA penalty scores, the analysis module may calculate the failover simulator storage ports utilizes a simulation to artificially create failure in each of any number of storage ports in the enterprise network 105 and calculate the maximum utilization penalty usage for the remaining storage ports. The failure simulator storage port for each of any number of storage ports may be calculated by:

$$\text{Score} = \frac{1}{n(n-1)} \sum_{f=1}^{n} \sum_{i=1, i \neq f}^{n} u(i, f) * w(i)$$

Where n is the total number of storage ports, u(i,f) calculates that utilization of storage port i, given the absence of storage port f, w(i) is a weighting term. In some embodiments, w(i) equals 1 for all storage ports. In various embodiments, w(i) may be a weighting based on the storage port services to prioritize higher tier traffic. One failover simulator storage port penalty score is calculated for read and another one for write. In some embodiments, the analysis module 206 may calculate an individual penalty for each storage port. The analysis module 206 may calculate an aggregate failover simulation storage port penalty by summing the individual failover simulation storage port penalty for each of any number of storage ports in the enterprise network 105. The analysis module 206 may calculate a weighted aggregate failover simulation storage port penalty score by multiplying the aggregate failover simulation storage port penalty score by the weight applied to the penalty score. In some embodiments, the analysis module 206 may use a similar method to determine the read and write failover simulation penalty scores for storage ports.

The analysis module 206 may calculate a path/speed mismatch which occurs when one or more parts of end to end connections of a data path do not have the same link speed and not be able to keep up with the others. In some embodiments, the analysis module 206 may calculate an individual path/speed mismatch penalty score by:

$$\text{Score} = \text{speed}(x_1, x_2, x_3 \ldots) * \frac{1}{\min(tierServiced)^2}$$

where $$\text{speed}(x_1, x_2, x_3 \ldots) = \begin{cases} 0 & \text{when all the speeds are equal} \\ 1 & \text{otherwise} \end{cases}$$

The analysis module 206 may calculate an aggregate path/speed mismatch penalty by summing the individual path/speed mismatch penalty for each of any number of storage ports in the enterprise network 105. The analysis module 206 may calculate a weighted aggregate path/speed mismatch penalty score by multiplying the aggregate path/speed mismatch penalty score by the weight applied to the penalty score.

In step 408 of FIG. 4, the analysis module 206 may calculate a total penalty score for the time frame by taking the sum aggregate penalty scores for each of any number of penalty rules. The total penalty score may be stored in the simulation datastore 226. The calculated total penalty score may be a part of the baseline recommendation. The baseline recommendation may be stored in the simulation datastore 226.

In step 312, the analysis module 206 may determine any number of recommendations of HBA-storage port configurations for a future time. There are at least three ways of coming up with one or more recommendations of HBA-storage port configurations for the future time, including: calculation of a standard deviation for each metric, simulation of various HBA-storage port configurations and simulation of hardware failures. Further details of step 312 can be seen in steps 510 through 516 of FIG. 5.

Figure 5:
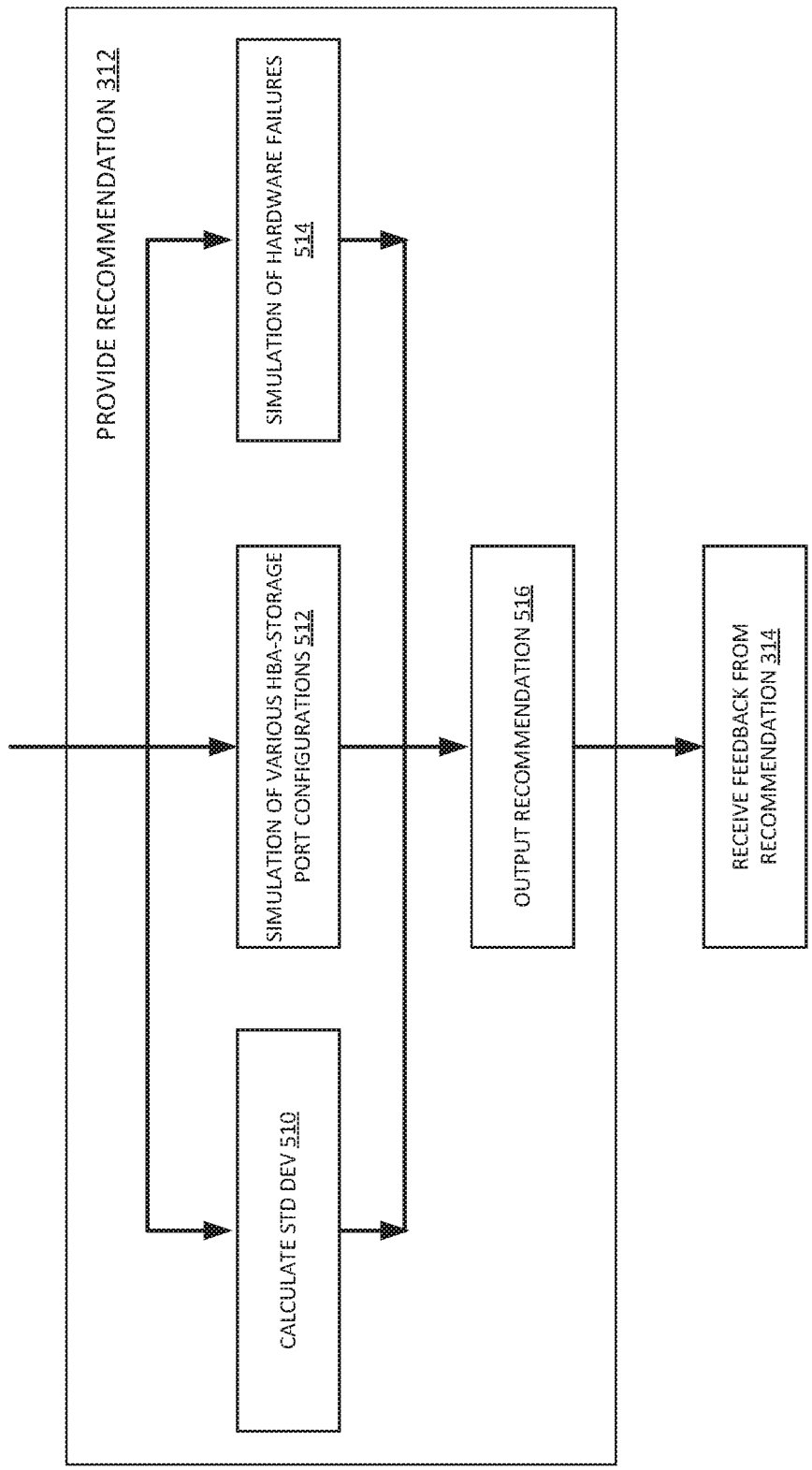
FIG. 5 depicts a flow chart of one step of the storage network traffic configuration, illustrating the various steps in providing recommendations for a future time in further detail according to some embodiments.

FIG. 5 depicts a flow chart of one step of the storage network traffic configuration, illustrating the various steps in providing recommendations for a future time in further detail according to some embodiments. Step 510 of FIG. 5 represents one way of determining one or more recommendations of HBA-storage port configurations for the future time: calculating standard deviations. The analysis module 206 may send a request to the simulation attributes module 214 to simulated traffic based on 1st, 2nd and 3rd standard deviations of each metric of the enterprise network 105. The metrics may include, but is not limited to: maximum write speed, typical read speeds, and buffer credits. The standard deviations of one or more metrics may be added to different data paths of the enterprise network 105 to create any number of standard deviation simulation scenarios. Any number of standard deviation simulation scenarios may be stored in the simulation datastore 226.

The analysis module 206 may send a request to the simulations datastore 226 for one of any number of standard deviation scenarios created by the simulation attributes module 214. For example, one of any number of standard deviation scenarios created by the simulation attributes module 214 may identify a particular data path associated with a tier 0 application and add a 2' standard deviation to the typical write speed, while keeping the typical write speed to the rest of the data paths and remaining metrics in all the data paths in the enterprise network 105 during the time frame the same as the data retrieved from the probes in step 302. The analysis module 206 may apply the past data analysis on the standard deviation scenario described above and determine the aggregate weighting to any number of penalty rules and the total penalty score using the one of any number of standard deviation scenarios. The standard deviation penalty score may be stored in the simulation datastore 226.

Step 512 of FIG. 5 represents another way of coming up with one or more recommendations of HBA-storage port configurations for the future time: simulation of various HBA-storage port configurations. The analysis module 206 may send a request to the simulations attributes module 214 to create a first configuration simulation scenario. If the analysis module 206 determines by calculation of any number of penalty rules that a first configuration simulation total penalty score is less than the baseline.

Any number of factors the simulation attributes module 214 may be account when creating any number of configuration simulation scenario, any number of factors may include keeping the end-to-end connections the same as much as possible. For example, the simulation attributes module 214 may create a second configuration simulation scenario in which data path 660 of FIG. 6, which couples HBA port HBA-H3-A to LUN9 via switch SA3 is replaced by a hypothetical data path in which HBA port HBA-H3-A is coupled to LUN9 via switch SA2 (data path not shown). In some embodiments, the simulation attributes module 214 may create a third configuration simulation scenario in which data path 656, which HBA port HBA-H2-A is coupled to LUN7 via switch SA2 is replaced with a hypothetical data path in which HBA port H3-A is coupled to LUN7 via switch SA2 (data path not shown).

Any number of factors the simulation attributes module 214 need to take into account when creating any number of configuration simulation scenario includes restricted ports, unused storage ports, and boundary conditions. The IT administrator of the network may restrict storage ports for purposes of redundancy and disaster recovery. The simulation attributes module 214 may keep restricted storage ports off limits when creating any number of configuration simulation scenarios.

The IT administrator of the network may enforce restrictions and now allow an HBA to connect a data path to a completely unused storage port. Boundary conditions may be employed include the total number of rearrangements suggested by configuration simulation scenarios. The simulation attributes module 214 may keep these factors in mind in creating any number of configuration simulation scenario. The configuration simulation penalty score may be stored in the simulation datastore 226.

Step 514 of FIG. 5 represents another way of coming up with one or more recommendations of HBA-storage port configurations for the future time: simulation of hardware failures. The analysis module 206 may send a request to the simulation attributes module 214 to create any number of hardware failure simulation scenarios. Each of any number of hardware failure simulation scenarios may comprise an HBA-storage port configuration in which one or more of a combination of HBA, switch fabric or storage port failure simulations.

The analysis module 206 may calculate the redistribution of the data traffic by applying one of any number of hardware failure simulation scenario to the enterprise system 100.

In the example enterprise network 600 of FIG. 6, the simulation attributes module 214 may create a first hardware failure simulation scenario in which switch SA1 fails. The HBA-storage port configuration of the first hardware failure simulation scenario may be stored in the simulation datastore 226. The simulation attributes module 214 may redistribute the data paths of 652, 654, and 658 with minimal changes to the end to end connections of the data paths. The analysis module 206 may apply the past data analysis on the first hardware failure simulation scenario to determine a first hardware simulation penalty score. The first hardware failure simulation penalty score may be stored in the simulation datastore 226.

In step 516 of FIG. 5, the reporting module 216 may output any number of recommendation penalty scores. Any number of recommendation penalty scores may include, but is not limited to: any number of standard deviation simulation penalty scores, any number of configuration simulation penalty scores, any number of hardware failure simulation penalty scores, and their associated HBA-storage port configurations.

In response to the reporting module 216 outputting any number of recommendation penalty scores of step 314, the input module 204 may receive, from the IT administrator feedback from any number of recommendation penalty scores. The feedback from any number of recommendation penalty scores may include, but is not limited to: a chosen recommendation penalty score which may represent an improvement to the total penalty score. In some embodiments, the chosen recommendation penalty score may represent an improvement to one or more aggregate weighting penalty score which may be particularly important to the IT administrator.

The HBA-storage port configuration associated with the chosen recommendation penalty score may represent one or more changes in the HBA, the storage port or the switch fabric of the enterprise network 105. In optional step 316, the input module 204 may receive a change ticket to an IT management software platform such as ServiceNow to request the one or more changes to the HBA, the storage port or the switch fabric of the enterprise network 105.

In step 318, the input module 204 may receive from IT administrator of the enterprise network 105 a request to schedule the storage network traffic configuration process.

The storage network traffic configuration process may return to step 302, and the input module 204 may receive a request to schedule the storage network traffic configuration process to start at a specified day of the week and/or time of the day and/or duration.

Figure 7:
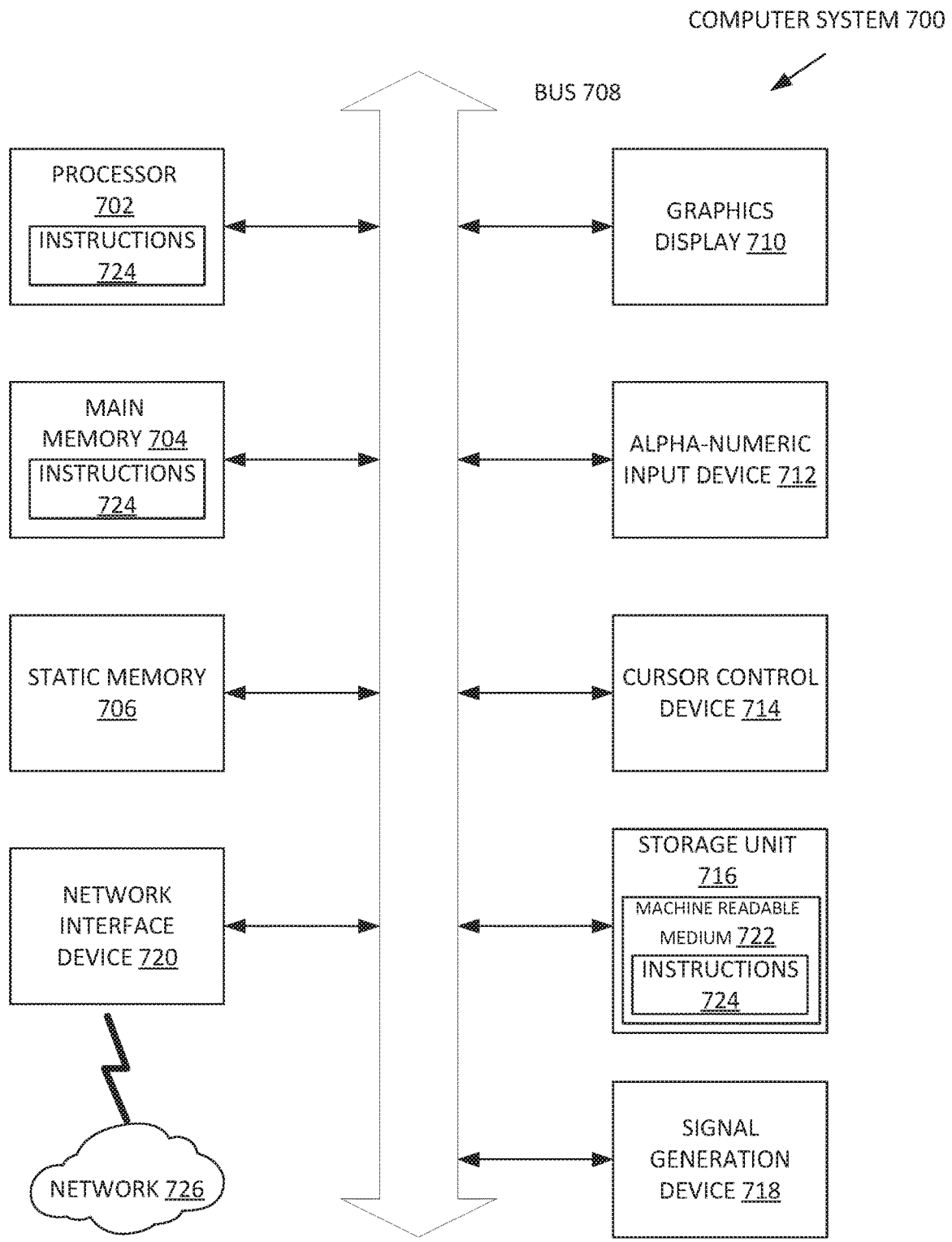
FIG. 7 depicts a block diagram illustrating entities of an example machine according to some embodiments.

FIG. 7 is a block diagram illustrating entities of an example machine able to read instructions from a machine-readable medium and execute those instructions in a processor to perform the machine processing tasks discussed herein, such as the engine operations discussed above. Specifically, FIG. 7 shows a diagrammatic representation of a machine in the example form of a computer system 700 within which instructions 724 (e.g., software) for causing the machine to perform any one or more of the methodologies discussed herein may be executed. In alternative embodiments, the machine operates as a standalone device or may be connected (e.g., networked) to other machines, for instance via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include graphics display unit 710 (e.g., a plasma display panel (PDP), a liquid crystal display (LCD), a projector, or a cathode ray tube (CRT)). The computer system 700 may also include alphanumeric input device 712 (e.g., a keyboard), a cursor control device 714 (e.g., a mouse, a track-ball, a joystick, a motion sensor, or other pointing instrument), a data store 716, a signal generation device 718 (e.g., a speaker), an audio input device 726 (e.g., a microphone) and a network interface device 720, which also are configured to communicate via the bus 708.

The data store 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network (not shown) via network interface 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "module" refers to computational logic for providing the specified functionality. A module can be implemented in hardware, firmware, and/or software. Where the modules described herein are implemented as software, the module can be implemented as a standalone program, but can also be implemented through other means, for example as part of a larger program, as any number of separate programs, or as one or more statically or dynamically linked libraries. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors as described above in connection with FIG. 7. Alternatively, hardware or software modules may be stored elsewhere within a computing system.

As referenced herein, a computer or computing system includes hardware elements used for the operations described here regardless of specific reference in FIG. 7 to such elements, including for example one or more processors, high speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

The invention claimed is:

1. A system comprising:
one or more processors; and
memory containing instructions configured to control the one or more processors to:
receive a begin time to initiate storage network traffic data collection from a plurality of data probes integrated within an enterprise network, the enterprise network in communication with the storage network;
collect network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, at least one of the plurality of specific HBA ports belong to a host of the enterprise network;
analyze the network data to determine attributes of network traffic, the attributes of the network traffic including read and write speeds of each storage port, one or more application identifiers identifying an application of the enterprise network associated with the network traffic, each application being associated with an application tier, the read speed and write speed being based at least in part on the information communicated between each of the plurality of specific HBA ports and the specific storage ports;
for each storage unit determine:
a plurality of penalty scores for each of the storage ports of a particular storage unit, the plurality of penalty scores including a utilization per tier mismatch and a maximum utilization score, the utilization per tier mismatch being greater if application tiers of applications being serviced by a particular storage port are further apart, the maximum utilization score being based on at least the write speed for the particular storage port; and
a total penalty score aggregating penalty scores associated with storage ports of the particular storage unit;
determine a reconfiguration of a storage unit or HBA based at least in part on the total penalty score of the storage unit;
simulate changes of the reconfiguration of the storage unit or the HBA and simulate storage network traffic based on at least some of the previously collected network data;
apply the simulated storage network traffic on the simulated changes of the reconfiguration of the storage unit or HBA to determine improvements of performance of the storage unit or HBA; and
output instructions to enable reconfiguration of the storage unit or HBA based on the simulation of the storage network traffic on the simulated changes of the reconfiguration of the storage unit or HBA.

2. The system of claim 1 further comprising receive an end time to initiate storage network traffic data collection from the plurality of data probes integrated within the enterprise network.

3. The system of claim 1 wherein the enterprise network includes the storage network.

4. The system of claim 1 wherein the data probes are hardware probes configured to monitor storage ports of the storage unit.

5. The system of claim 1 wherein the data probes are software probes configured to receive storage network traffic from a switch fabric of the enterprise network.

6. The system of claim 1 wherein analyze the network further determines workload divergence of each storage port, the workload divergence based at least in part on the information communication between each of the plurality of specific HBA ports and the specific storage ports.

7. The system of claim 1 wherein the attributes of the network traffic further including workload divergence, buffer credit, and failover simulation.

8. The system of claim 7 wherein the workload divergence penalizes the particular storage port when there is a deviation in a size of data requests.

9. The system of claim 1 wherein each of the plurality of penalty scores is weighted based on enterprise network factors including the application tier associated with one or more applications of the enterprise network.

10. The system of claim 1 wherein the simulate changes of the reconfiguration of the storage unit or HBA including simulation failure one or more of a plurality of entities of the enterprise network.

11. The system of claim 1 wherein the simulate changes of the reconfiguration of the storage unit or HBA including simulation of HBA-storage port configuration of the enterprise network, the simulation of HBA-storage port configuration including changing the HBA-storage port configuration of a data path of the enterprise network.

12. The system of claim 7 wherein the simulation of HBA-storage port configuration is randomized.

13. A method comprising:
receiving a begin time to initiate storage network traffic data collection from a plurality of data probes integrated within an enterprise network, the enterprise network in communication with the storage network;
collecting network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, at least one of the plurality of specific HBA ports belong to a host of the enterprise network;
analyzing the network data to determine attributes of network traffic, the attributes of the network traffic including read and write speeds of each storage port, one or more application identifiers, each application identifier identifying an application of the enterprise network associated with the network traffic, each application being associated with an application tier, the read speed and write speed being based at least in part on the information communicated between each of the plurality of specific HBA ports and the specific storage ports;

determining for each storage unit:
  a plurality of penalty scores for each of the storage ports of a particular storage unit, the plurality of penalty scores including a utilization per tier mismatch and a maximum utilization score, the utilization per tier mismatch being greater if application tiers of applications being services by a particular storage port are further apart, the maximum utilization score being based on at least the write speed for the particular storage port; and
  a total penalty score aggregating penalty scores associated with storage ports of the particular storage unit, aggregating penalty scores includes weighting each of the plurality of penalty scores;

determining a reconfiguration of a storage unit or HBA based at least in part on the total penalty score of the storage unit;

simulating changes of the reconfiguration of the storage unit or the HBA and simulate storage network traffic based on at least some of the previously collected network data;

applying the simulated storage network traffic on the simulated changes of the reconfiguration of the storage unit or HBA to determine improvements of performance of the storage unit or HBA; and outputting instructions to enable reconfiguration of the storage unit or HBA based on the simulation of the storage network traffic on the simulated changes of the reconfiguration of the storage unit or HBA.

14. The method of claim 13 further comprising receiving an end time to initiate storage network traffic data collection from the plurality of data probes integrated within the enterprise network.

15. The method of claim 13 wherein the enterprise network includes the storage network.

16. The method of claim 13 wherein the data probes are hardware probes configured to monitor storage ports of the storage unit.

17. The method of claim 13 wherein the data probes are software probes configured to receive storage network traffic from a switch fabric of the enterprise network.

18. A computer program product comprising a computer readable non-transitory storage medium having program code embodied therewith, the program code executable by a computing system to cause the computing system to perform:
  receiving a begin time to initiate storage network traffic data collection from a plurality of data probes integrated within an enterprise network, the enterprise network in communication with the storage network;
  collecting network data from the plurality of data probes integrated within the enterprise network, the network data identifying a plurality of specific host bus adapter (HBA) ports that are used to communicate with specific storage ports of a plurality of storage units of the storage network, the network data including information communicated between each of the plurality of specific HBA ports and the specific storage ports, at least one of the plurality of specific HBA ports belong to a host of the enterprise network;
  analyzing the network data to determine attributes of network traffic, the attributes of the network traffic including read and write speeds of each storage port, one or more application identifiers, each application identifier identifying an application of the enterprise network associated with the network traffic, each application being associated with an application tier, the read speed and write speed being based at least in part on the information communicated between each of the plurality of specific HBA ports and the specific storage ports;
  determining for each storage unit:
    a plurality of penalty scores for each of the storage ports of a particular storage unit, the plurality of penalty scores including a utilization per tier mismatch and a maximum utilization score, the utilization per tier mismatch being greater if application tiers of applications being serviced by a particular storage port are further apart, the maximum utilization score being based on at least the write speed for the particular storage port; and
    a total penalty score aggregating penalty scores associated with storage ports of the particular storage unit;
  determining a reconfiguration of a storage unit or HBA based at least in part on the total penalty score of the storage unit;
  simulating changes of the reconfiguration of the storage unit or the HBA and simulate storage network traffic based on at least some of the previously collected network data;
  applying the simulated storage network traffic on the simulated changes of the reconfiguration of the storage unit or HBA to determine improvements of performance of the storage unit or HBA; and
  outputting instructions to enable reconfiguration of the storage unit or HBA based on the simulation of the storage network traffic on the simulated changes of the reconfiguration of the storage unit or HBA.

19. The computer program product of claim 18 wherein the program code further causes the computing system to perform receiving an end time to initiate storage network traffic data collection from the plurality of data probes integrated within the enterprise network.

* * * * *